(12) United States Patent
Miyajima

(10) Patent No.: US 11,778,060 B2
(45) Date of Patent: *Oct. 3, 2023

(54) INFORMATION PROCESSING SYSTEM AND INFORMATION PROCESSING METHOD

(71) Applicant: SONY CORPORATION, Tokyo (JP)

(72) Inventor: Yasushi Miyajima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/195,765

(22) Filed: Mar. 9, 2021

(65) Prior Publication Data

US 2021/0227036 A1 Jul. 22, 2021

Related U.S. Application Data

(63) Continuation of application No. 16/320,161, filed as application No. PCT/JP2017/019448 on May 25, 2017, now Pat. No. 10,965,764.

(30) Foreign Application Priority Data

Aug. 16, 2016 (JP) .................................. 2016-159742

(51) Int. Cl.
*G06F 3/048* (2013.01)
*H04L 67/50* (2022.01)
(Continued)

(52) U.S. Cl.
CPC .......... *H04L 67/535* (2022.05); *G06F 11/079* (2013.01); *G06F 16/9535* (2019.01);
(Continued)

(58) Field of Classification Search
None
See application file for complete search history.

(56) References Cited

U.S. PATENT DOCUMENTS 8,738,414 B1 * 5/2014 Nagar .................. G06Q 10/103
705/7.12
2005/0234781 A1 * 10/2005 Morgenstern ...... G06Q 30/0641
705/26.61
(Continued)

FOREIGN PATENT DOCUMENTS

CN 102117325 A 7/2011
EP 2660771 A1 11/2013
(Continued)

OTHER PUBLICATIONS

Maeda, et al., "Design of Agent's Behaviors in Artificial School Class Game Using Player's Action Recording", The Institute of Electronics, Information, and Communication Engineering, vol. J97-A, No. 8, Aug. 1, 2014, pp. 565-573.
(Continued)

*Primary Examiner* — Xuyang Xia
(74) *Attorney, Agent, or Firm* — CHIP LAW GROUP

(57) ABSTRACT

There is provided an information processing system that includes a communication unit that acquires act information indicating occurrence of a first act from a first user to a second user, an accumulation unit that accumulates at least a user who has performed the act, a user influenced by the act, and a type of the act in units of acts in order of occurrence of the acts, and a control unit that performs control, when a second act determined to have influenced the first act is found from among acts that are accumulated in the accumulation unit and from which the first user has received influence in past, to record the first act and the second act in association with each other in the accumulation unit.

9 Claims, 20 Drawing Sheets

(51) Int. Cl.
*G06F 16/9535* (2019.01)
*G06F 11/07* (2006.01)
*H04M 3/10* (2006.01)
*H04N 1/00* (2006.01)

(52) U.S. Cl.
CPC .......... *H04M 3/10* (2013.01); *H04N 1/00411* (2013.01); *G06F 3/048* (2013.01); *H04N 2201/0094* (2013.01)

(56) References Cited

U.S. PATENT DOCUMENTS

| | | | | |
|---|---|---|---|---|
| 2010/0115419 | A1* | 5/2010 | Mizuno | G06Q 30/02 715/745 |
| 2011/0055132 | A1* | 3/2011 | Mahdian | G06Q 10/00 706/46 |
| 2011/0237227 | A1* | 9/2011 | Kemery | G06F 21/629 455/414.1 |
| 2013/0275514 | A1* | 10/2013 | Tanaka | G06Q 30/02 709/204 |
| 2014/0019539 | A1* | 1/2014 | Novak | G06Q 30/0201 709/204 |
| 2015/0348123 | A1 | 12/2015 | Darwin | |
| 2016/0021153 | A1* | 1/2016 | Hull | G06F 16/337 715/753 |
| 2017/0192994 | A1* | 7/2017 | Hong | G06F 16/164 |

FOREIGN PATENT DOCUMENTS

| | | |
|---|---|---|
| JP | 2006-031414 A | 2/2006 |
| JP | 2009-026137 A | 2/2009 |
| JP | 2011-188245 A | 9/2011 |
| JP | 2013-257800 A | 12/2013 |
| JP | 2015-103018 A | 6/2015 |
| JP | 2015-220699 A | 12/2015 |
| WO | 2008/108000 A1 | 9/2008 |
| WO | 2012/090697 A | 7/2012 |
| WO | 2012/090697 A1 | 7/2012 |

OTHER PUBLICATIONS

International Search Report and Written Opinion of PCT Application No. PCT/JP2017/019448, dated Jul. 4, 2017, 06 pages of English Translation and 06 pages of ISRWO.

International Preliminary Report on Patentability of PCT Application No. PCT/JP2017/019448, dated Feb. 28, 2019, 06 pages of English Translation and 03 pages of IPRP.

Non-Final Office Action for U.S. Appl. No. 16/320,161, dated Mar. 31, 2020, 20 pages.

Final Office Action for U.S. Appl. No. 16/320,161, dated Sep. 8, 2020, 17 pages.

Notice of Allowance for U.S. Appl. No. 16/320,161, dated Nov. 30, 2020, 13 pages.

Office Action for JP Patent Application No. 2018-534274, dated Apr. 27, 2021, 02 pages of English Translation and 02 pages of Office Action.

* cited by examiner

FIG. 5

| ITEM | EXAMPLE OF VALUE |
|---|---|
| KUUID | 2397458543 |
| AGENT ID | 00000384 |
| PATIENT ID | 02539123 |
| DATE AND TIME | May 25, 2016 10:25:14 am |
| PLACE | NORTH LATITUDE 35.6500242<br>EAST LONGITUDE 139.7523531 |
| ACT CATEGORY | KINDNESS |
| ACT SUBCATEGORY | VOLUNTEER (FRIEND/ACQUAINTANCE) |
| ACT DETAIL | TAKING CARE OF FRIEND'S CHILD |

FIG. 6

| ACT CATEGORY | SUPPLEMENT |
|---|---|
| KINDNESS | |
| WORD OF MOUTH | WORD OF MOUTH SUCH AS "RAMEN THERE IS DELICIOUS" AND "THAT SONG IS GOOD" |
| HEARSAY, GOSSIP | HEARSAY SUCH AS "I HEARD THAT ○○ HAS CHANGED JOB" AND "I HEARD THAT ○○ IS GOING TO MARRY" |
| COMMENT | PROPAGATION WHEN ONE AGREES WITH COMMENT OF "I THINK THIS WAY ABOUT ○○" |
| ... | ... |

FIG. 7

| ACT-OF-KINDNESS SUBCATEGORY | EXAMPLE OF DETAIL OF ACT OF KINDNESS |
|---|---|
| PHYSICAL SUPPORT | OFFERING ONE'S SEAT, CARRYING HEAVY BAGGAGE, PULLING HAND, ETC. |
| VOLUNTEER (JOB) | HELPING TAKING COPIES, HELPING CREATION OF DOCUMENTS, ETC. |
| VOLUNTEER (FRIEND) | HELPING HOUSE-MOVING, TAKING CARE OF FRIEND'S CHILD, ETC. |
| OFFER | PRESENTING SOMETHING, GIVING TREAT, INVITING TO HOUSE, ETC. |
| EDUCATION AND ADVICE | TEACHING STUDY, GIVING ADVICE, ETC. |
| CRIME PREVENTION/SECURITY | HELPING PERSON BEING PESTERED BY RASCAL, CALLING AMBULANCE FOR PERSON WHO HAS FALLEN TO GROUND, ETC. |
| ... | ... |

| ITEM | EXAMPLE OF VALUE |
|---|---|
| AGENT ID | 00000934 |
| PATIENT ID | 48480434 |
| DATE AND TIME | Jan 2, 2015 11:13:35 PM |
| ACT CATEGORY | WORD OF MOUTH |
| ACT SUBCATEGORY | FOOD |
| ACT DETAIL | (ID INDICATING) YOKOHAMA AA STORE |

INFORMATION PROCESSING SYSTEM AND INFORMATION PROCESSING METHOD

CROSS REFERENCE TO RELATED APPLICATIONS

The present application is a continuation application of U.S. patent application Ser. No. 16/320,161, filed on Jan. 24, 2019, which is a National Stage Entry of Patent Application No. PCT/JP2017/019448 filed on May 25, 2017, which claims priority from prior Japanese Patent Application JP 2016-159742 filed in the Japan Patent Office on Aug. 16, 2016, the entire contents of which are hereby incorporated by reference.

TECHNICAL FIELD

The present disclosure relates to an information processing system and an information processing method.

BACKGROUND ART

In recent years, research for measuring happiness of people and measures for improving happiness have been underway in units of regions, companies, countries, and the like, and policies for directing people's life to a good direction have been considered.

In addition, there have been movements for improving happiness of the entire society by encouraging acts of kindness. For example, there is a municipality that has a system of recommending a person who acted kindly and honoring the person once a year.

In regard to such evaluation of acts of kindness, for example, Patent Literature 1 below describes a gratitude providing system that provides, in the form of visual value information, the feeling of gratitude to another user who has given an impressive or kind act.

In addition, with recent development of communication technologies, technologies of grasping a communication path of the Internet or the like and an e-mail forwarding history have been proposed. For example, Patent Literature 2 below describes that an e-mail forwarding history is stored in an e-mail processing server, and when a reminder e-mail is received from a requester, the reminder e-mail is forwarded to a destination to which a request e-mail from the requester has been forwarded. In addition, Patent Literature 3 below describes a system in which a node on a forwarding path of content cashes content and saves a content forwarding history. In addition, Patent Literature 4 below describes that even if friends, attributes, or the like of users are not registered in advance, a social graph indicating connections and relationships between people can be generated. For example, the URL of a restaurant to be a dinner venue is sent to participants, and a social graph of people participating in the dinner is automatically generated on the basis of access to the URL by the participants.

CITATION LIST

Patent Literature

Patent Literature 1: WO 2008/108000
Patent Literature 2: JP 2011-188245A
Patent Literature 3: JP 2015-220699A
Patent Literature 4: JP 2013-257800A

DISCLOSURE OF INVENTION

Technical Problem

However, propagation of an act of kindness etc. performed for a person is not visible, and it cannot be found how much a good act that one has performed exerts influence on a partner or a society.

In addition, there is a saying that "One good turn deserves another". This traditional teaching means that a good for a person not only serves for the person, but also eventually returns to oneself after bouncing around from one place to the next, and teaches to be kind to people; however, there has been no way to actually know whether or not an act of kindness that one has performed returns to oneself by propagation.

Hence, the present disclosure proposes an information processing system and an information processing method capable of grasping propagation of acts in a society.

Solution to Problem

According to the present disclosure, there is proposed an information processing system including: a communication unit configured to acquire act information indicating occurrence of a first act from a first user to a second user; an accumulation unit configured to accumulate at least a user who has performed the act, a user influenced by the act, and a type of the act in units of acts in order of occurrence of the acts; and a control unit configured to, when a second act determined to have influenced the first act is found from among acts that are accumulated in the accumulation unit and from which the first user has received influence in past, perform control to record the first act and the second act in association with each other in the accumulation unit.

According to the present disclosure, there is proposed an information processing method including, by a processor: acquiring, via a communication unit, act information indicating occurrence of a first act from a first user to a second user; accumulating, in an accumulation unit, at least a user who has performed the act, a user influenced by the act, and a type of the act in units of acts in order of occurrence of the acts; and when a second act determined to have influenced the first act is found from among acts that are accumulated in the accumulation unit and from which the first user has received influence in past, performing control to record the first act and the second act in association with each other in the accumulation unit.

Advantageous Effects of Invention

According to the present disclosure as described above, propagation of acts in a society can be grasped.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 illustrates an example of a data configuration of act information according to the present embodiment.

FIG. 6 illustrates examples of an act category according to the present embodiment.

FIG. 7 illustrates examples of an act-of-kindness subcategory according to the present embodiment.

MODE(S) FOR CARRYING OUT THE INVENTION

Figure 1:
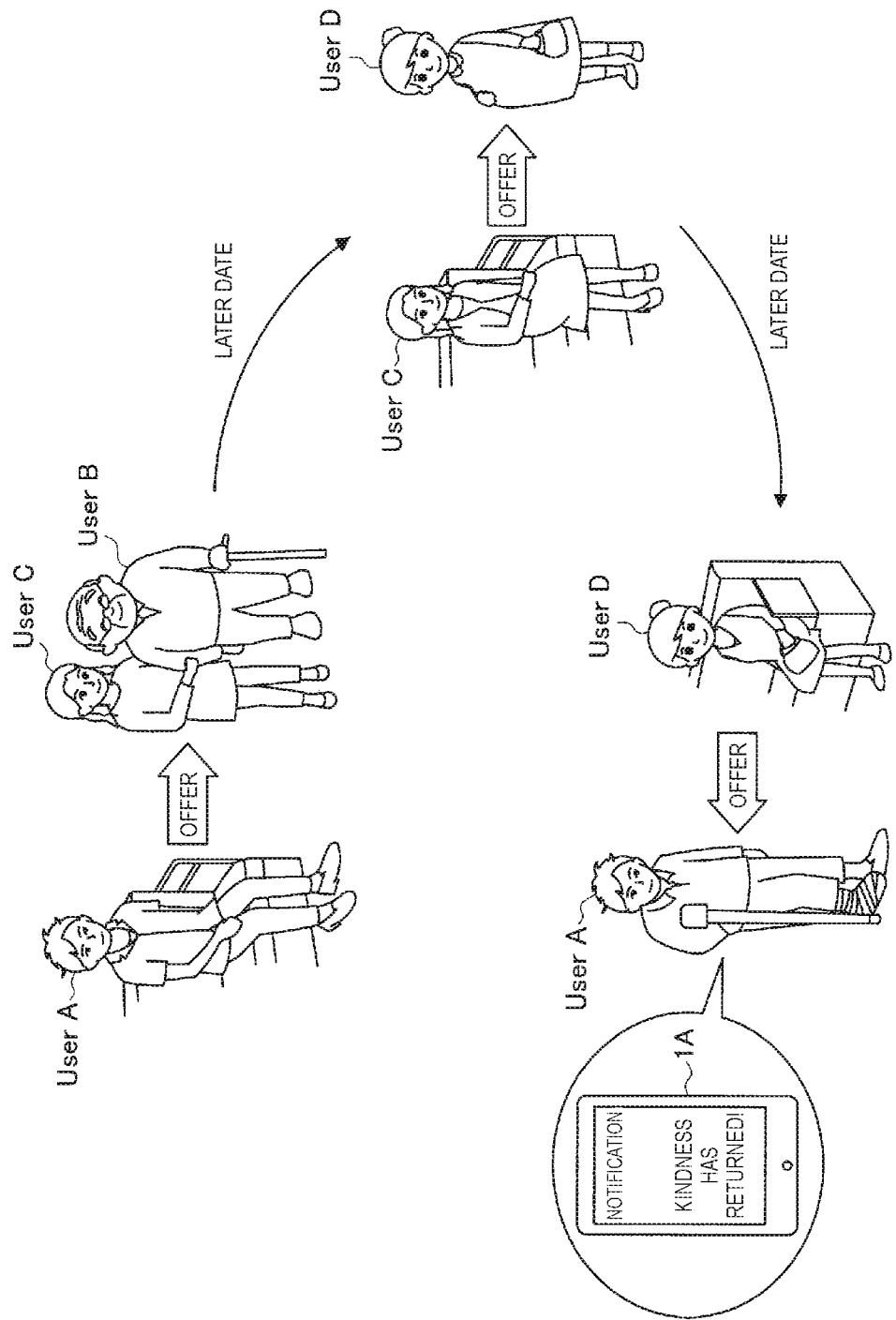
FIG. 1 is a diagram for describing an overview of an information processing system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, description will be given in the following order.
1. Overview of information processing system according to embodiment of present disclosure
2. Configuration
2-1. Configuration of client terminal
2-2. Configuration of server
3. Examples
3-1. First example
3-2. Second example
3-3. Third example
4. Conclusion

1. OVERVIEW OF INFORMATION PROCESSING SYSTEM ACCORDING TO EMBODIMENT OF PRESENT DISCLOSURE

FIG. 1 is a diagram for describing an overview of an information processing system according to an embodiment of the present disclosure. As illustrated in FIG. 1, in the case where user A performs an act of kindness of offering his/her seat to user B who is standing with a cane in a train, for example, this presumably exerts influence on user C, a daughter who is with user B. User C who has received influence wishes to do an act of kindness too and offers his/her seat when encountering user D who is pregnant, for example, in a train at a later date. Such propagation of acts of kindness can be expected. Then, it can be expected that, at a further later date, user D influenced by user C wishes to do an act of kindness too and offers his/her seat to user A who is injured after childbirth, for example.

In this case, it can be said that the act of kindness first performed by user A propagates and returns to him/herself, but conventionally there has been no way to know such propagation of acts of kindness.

Hence, the present embodiment makes it possible to grasp propagation of good acts such as acts of kindness in a society. More specifically, the information processing system according to the present embodiment accumulates act information to enable tracking of propagation of acts. Thus, for example, in the case where an act performed by a certain user propagates and returns to the user him/herself, notification such as "Kindness has returned!" can be made on a client terminal 1 as illustrated in FIG. 1. Acts of kindness can be encouraged and a better society can be achieved by making it possible to find that one's own act of kindness has returned after bouncing around from one place to the next.

In addition, the information processing system according to the present embodiment can visualize propagation of acts of kindness and present it to a user. This makes it possible to recognize that one's own kindness helps people and spreads, and can be expected to satisfy an appetite for contribution to society.

Figure 2:
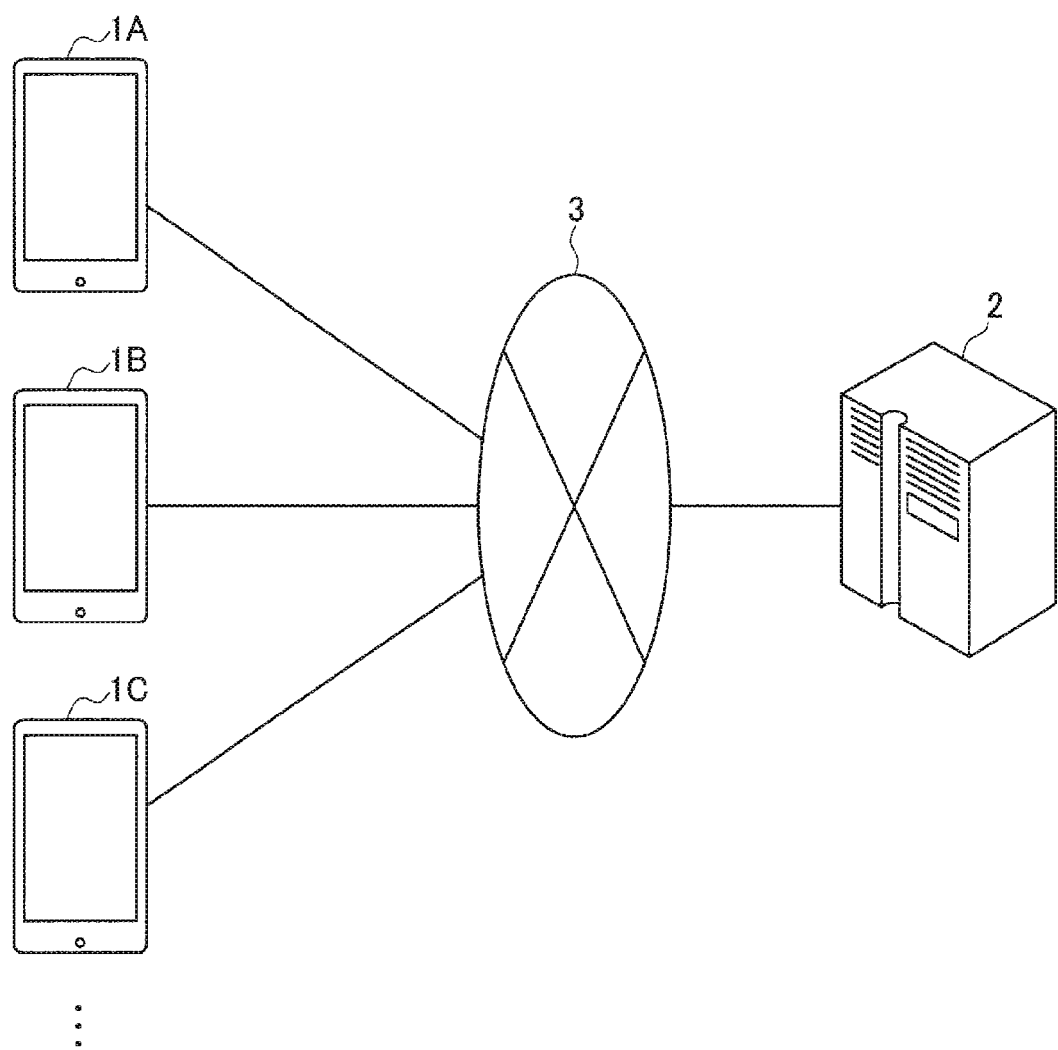
FIG. 2 illustrates an overall configuration of an information processing system according to the present embodiment.

An overall configuration of such an information processing system according to the present embodiment will be described with reference to FIG. 2. FIG. 2 illustrates an overall configuration of an information processing system according to the present embodiment. As illustrated in FIG. 2, the information processing system according to the present embodiment includes the client terminal 1 and a server 2. The client terminal 1 and the server 2 are connected via a network 3, and transmit and receive data.

The client terminal 1 may be implemented by, as well as a smartphone illustrated in FIG. 1, a mobile phone terminal, a tablet terminal, a wearable terminal (a smart band, a smartwatch, a HMD, a transmissive glasses-type HMD, etc.), or the like. In the present embodiment, information regarding a predetermined act received by a user is transmitted to the server 2 from each client terminal 1, for example, and managed and accumulated as act information in the server 2.

The server 2 tracks propagation of acts on the basis of accumulated act information, and performs visualization of propagation, notification of return of an act due to propagation, and the like. Specifically, for example, when acquiring act information indicating occurrence of a first act (interaction) from a first user to a second user (information regarding the first act that the second user has received from the first user), the server 2 searches whether or not an act estimated to have exerted influence on the first act is included in acts received by the first user in the past. Then, when a second act estimated to have exerted influence is found, the server 2 records the first act and the second act in association with each other (updates a two-way list described later). In addition, the server 2 searches back for such association, and in the case where it is found that an act performed by the second user in the past had exerted influence, notifies the second user that his/her own act has returned.

The information processing system according to an embodiment of the present disclosure has been described. Now, a specific configuration of each device included in the information processing system according to the present embodiment will be described with reference to drawings.

2. CONFIGURATION

2-1. Configuration of Client Terminal

Figure 3:
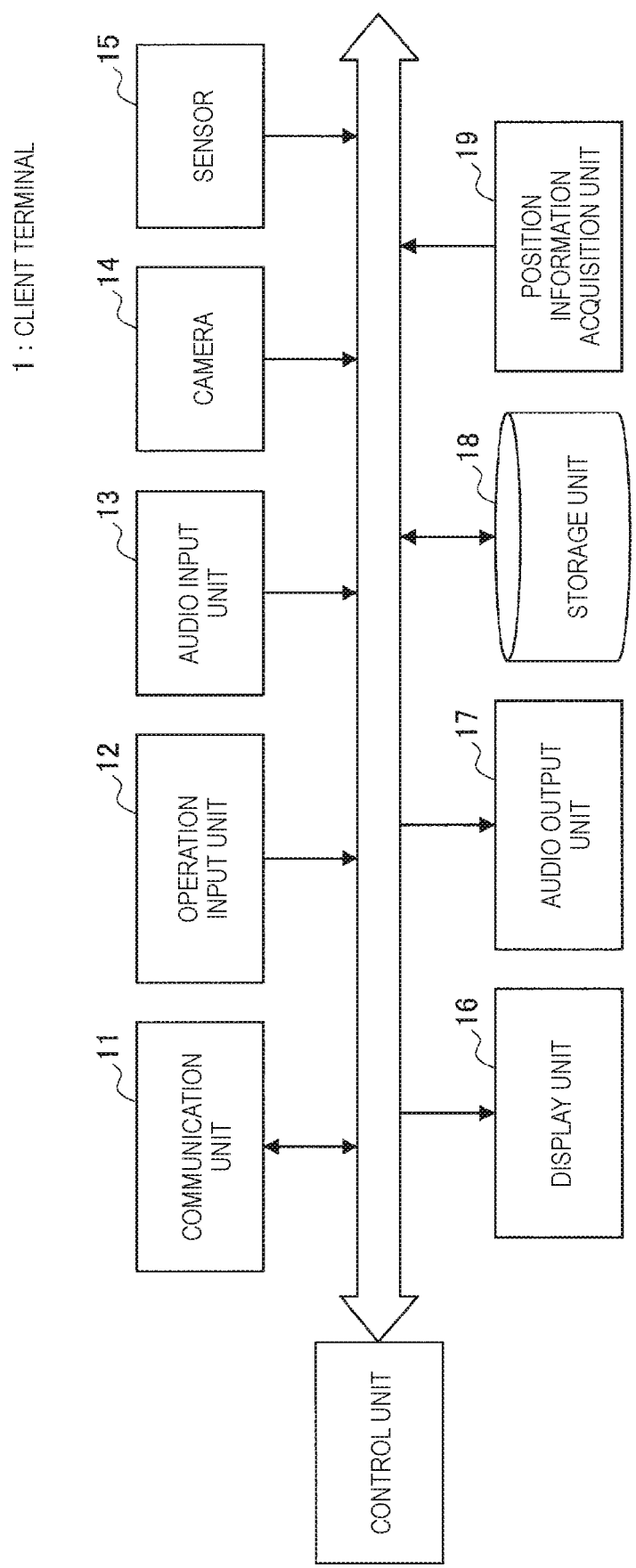
FIG. 3 is a block diagram illustrating an example of a configuration of a client terminal according to the present embodiment.

FIG. 3 is a block diagram illustrating an example of a configuration of the client terminal 1 according to the present embodiment. As illustrated in FIG. 3, the client terminal 1 includes a control unit 10, a communication unit 11, an operation input unit 12, an audio input unit 13, a camera 14, a sensor 15, a display unit 16, an audio output unit 17, a storage unit 18, and a position information acquisition unit 19.

The control unit 10 functions as an arithmetic processing device and a control device, and controls the overall operation of the client terminal 1 in accordance with a variety of programs. The control unit 10 is implemented, for example, by an electronic circuit such as a central processing unit (CPU) and a microprocessor. In addition, the control unit 10 may include a read only memory (ROM) that stores a program, an operation parameter and the like to be used, and a random access memory (RAM) that temporarily stores a parameter and the like varying as appropriate.

In addition, in the case where a user receives some sort of act, the control unit 10 according to the present embodiment performs control to transmit, from the communication unit 11 to the server 2, at least any of audio data collected by the audio input unit 13, a captured image captured by the camera 14, various sensor data detected by the sensor 15, or user operation information in the client terminal 1 together with position information acquired by the position information acquisition unit 19, as information regarding an act received by the user. A state of data transmitted to the server 2 is not particularly limited; for example, data before analysis may be transmitted, or an action recognition result may be transmitted. The control unit 10 may recognize an action or a state of the user by using at least any of audio data, a captured image, sensor data, or position information. For example, the control unit 10 can recognize that the user has sat down or stood up in a train by using acceleration sensor data and position information. In addition, in the case where the user's word of gratitude such as "thank you" is recognized by voice recognition, the control unit 10 can recognize to whom the user has thanked (from whom an act of kindness has been received) on the basis of a captured image captured by the camera 14.

In addition, the control unit 10 acquires an ID of an agent who has performed an act, via short-range wireless communication such as Bluetooth or Wi-Fi, for example, and includes the ID in information regarding an act received by the user and transmits the information. In the case where a partner is a family member, a friend, or an acquaintance connected by social networking service (SNS), the user may be made to press a button such as "Thank you!" corresponding to a user name or an icon of the partner displayed in conjunction with SNS on a display screen. In this case, the control unit 10 acquires the ID of the partner as an agent ID, and the ID of the user as a patient ID, and includes the IDs in information regarding an act (of kindness) received by the user and transmits the information to the server 2.

The communication unit 11 is a communication module for transmitting and receiving data to and from another device by a local area network (LAN), Wireless Fidelity (Wi-Fi; registered trademark), or the like. For example, the communication unit 11 transmits and receives data by connecting to the server 2 via the network 3, and transmits and receives data by directly connecting to a peripheral device (not illustrated) by Bluetooth (registered trademark) or Wi-Fi (registered trademark).

The operation input unit 12 detects operation input by the user, and outputs a detected input signal to the control unit 10. The operation input unit 12 is implemented by a touch panel, a switch, a button, or the like.

The audio input unit 13 collects the user's voice or surrounding environmental sound, and outputs an audio signal to the control unit 10. The audio input unit 13 is implemented by a microphone, a mic amplification unit that performs amplification processing on an audio signal obtained by the microphone, and an A/D converter that performs digital conversion on an audio signal.

The camera 14 includes a lens system including an imaging lens, a diaphragm, a zoom lens, a focus lens, and the like, a drive system that causes the lens system to perform focus operation and zoom operation, a solid-state image sensor array that generates an imaging signal by photoelectrically converting imaging light obtained by the lens system, and the like. The solid-state image sensor array may be implemented by, for example, a charge coupled device (CCD) sensor array or a complementary metal oxide semiconductor (CMOS) sensor array.

The sensor 15 has a function of detecting an act of the user. For example, the sensor 15 may be a motion sensor (an acceleration sensor, a gyro sensor, a geomagnetic sensor, or the like), a bio-sensor (a heartbeat sensor, a pulse sensor, a perspiration sensor, a body temperature sensor, a blood pressure sensor, a brain wave sensor, or the like), or an environment sensor (a temperature sensor, a barometric sensor, or the like). In addition, the sensor 15 may be a sensor group including a plurality of sensors.

The display unit 16 is a display device that outputs various screens such as a menu screen and an operation screen. The display unit 16 may be, for example, a display device such as a liquid crystal display (LCD) or an organic electroluminescence (EL) display.

The audio output unit 17 includes a speaker that reproduces an audio signal and an amplification circuit for the speaker. For example, the audio output unit 17 outputs notification sound or voice making a notification that an act of kindness has returned to the user him/herself. Note that in the present embodiment, notification to the user is not limited to an image or sound, and may be vibration, light, or the like, for example. In this case, the client terminal 1 includes a vibration unit or a light emitting unit.

The storage unit 18 is implemented by a read only memory (ROM) that stores programs, operation parameters, or the like used in processing by the control unit 10, and a random access memory (RAM) that temporarily stores parameters that change as appropriate or the like. In addition, the storage unit 18 includes a storage device including a storage medium, a recording device for recording data on the storage medium, a reader device for reading out data from the storage medium, a deletion device for deleting data recorded on the storage medium, and the like. Note that the storage unit 18 may be, for example, a storage medium, such as a nonvolatile memory such as flash ROM (or flash memory), electrically erasable programmable read-only memory (EEPROM), and erasable programmable ROM (EPROM), a magnetic disk such as a hard disk and a disk-type magnetic disk, an optical disc such as a compact disc (CD), a digital versatile disc recordable (DVD-R), and a Blu-Ray disc (BD; registered trademark), and a magneto optical (MO) disk.

The position information acquisition unit 19 has a function of detecting the current position of the client terminal 1 on the basis of an externally acquired signal. Specifically, for example, the position information acquisition unit 19 is implemented by a global positioning system (GPS) measurement unit, receives radio waves from a GPS satellite, detects the positon of the client terminal 1, and outputs the detected position information to the control unit 10. In addition, the position information acquisition unit 19 may sense the position, for example, in accordance with Wi-Fi, Bluetooth, transmission and reception to and from a mobile phone/PHS/smartphone or the like, short-range communication, or the like in addition to the GPS.

The configuration of the client terminal 1 has been described. The client terminal 1 may be implemented by a wearable terminal (a HMD, a transmissive glasses-type wearable terminal (smart glasses), a smart band, a smartwatch, a smart neckband, etc.) worn on a user, a smartphone, a mobile phone terminal, a table terminal, a game console, a music player, or the like. In addition, part of the configuration illustrated in FIG. 3 may be provided separately, and in this case, the client terminal 1 connects by communication to the separate part to transmit and receive data. For example, in the case where the client terminal 1 is a smartphone and the sensor 15 is provided in a wearable terminal, the client terminal 1 may acquire sensing data from the wearable terminal.

2-2. Configuration of Server

Figure 4:
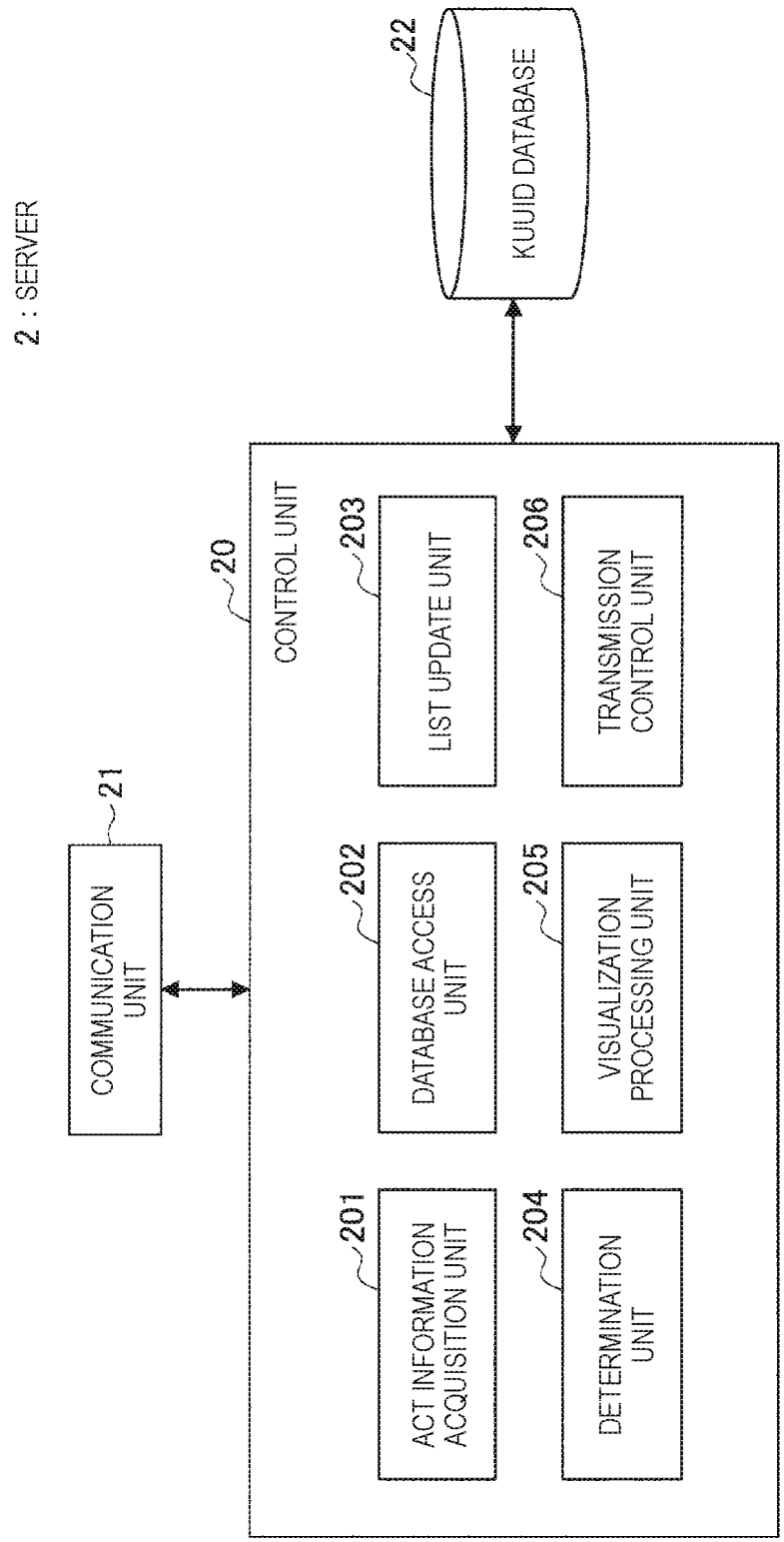
FIG. 4 is a block diagram illustrating an example of a configuration of a server according to the present embodiment.

FIG. 4 is a block diagram illustrating an example of a configuration of the server 2 according to the present embodiment. As illustrated in FIG. 4, the server 2 includes a control unit 20, a communication unit 21, and a KUUID database 22.

The control unit 20 functions as an arithmetic processing device and a control device, and controls the overall operation of the server 2 in accordance with a variety of programs. The control unit 20 is implemented, for example, by an electronic circuit such as a central processing unit (CPU) and a microprocessor. In addition, the control unit 20 may include a read only memory (ROM) that stores a program, an operation parameter and the like to be used, and a random access memory (RAM) that temporarily stores a parameter and the like varying as appropriate.

In addition, the control unit 20 according to the present embodiment also functions as an act information acquisition unit 201, a database access unit 202, a list update unit 203, a determination unit 204, a visualization processing unit 205, and a transmission control unit 206.

The act information acquisition unit 201 generates act information to which a unique ID is allocated, on the basis of information regarding an act received by the user transmitted from the client terminal 1. For example, the act information acquisition unit 201 performs action recognition processing, determination of an act category, or the like on the basis of audio data, imaging data, or sensor data and position information, and generates act information. Act information includes a person who has performed an act, a person who has received the act, date and time, place, an act category, an act detail, and the like. The generated act information is output to the database access unit 202. In the present embodiment, description is given focusing on an act of kindness as an example among various acts. Therefore, in this specification, an ID allocated to such information of an act of kindness is referred to as a Kindness Universally Unique ID (KUUID).

Here, FIG. 5 illustrates an example of a data configuration of act information. As illustrated in FIG. 5, act information includes information such as an allocated KUUID, an agent ID, a patient ID, date and time, place (e.g., position information), an act category, an act subcategory, and an act detail. The KUUID, the agent ID, and the patient ID is identification information unique throughout the system. In addition, position information is not essential, but is used in visualization of propagation described later in some cases. In addition, an act category is not limited to "kindness" as illustrated in FIG. 5. Here, examples of an act category are described with reference to FIG. 6.

As illustrated in FIG. 6, as an act category, a word-of-mouth act, an act of hearsay or gossip, an act of comment (statement), and the like are assumed as well as an act of kindness. The act information acquisition unit 201 determines a category under which an act received by the user falls, on the basis of a voice recognition result, an analysis result of a captured image, acceleration sensor data, position information, and the like. Note that determination of an act category may be performed on the client terminal 1 side, and act information as illustrated in FIG. 5 (in this case, "KUUID" is excluded) may be transmitted from the client terminal 1, have a KUUID allocated by the act information acquisition unit 201, and be output to the database access unit 202.

In addition, examples of an act-of-kindness subcategory are described with reference to FIG. 7. As illustrated in FIG. 7, examples of a subcategory of an act of kindness include physical support, volunteer (job, official), volunteer (between friends, private), offer, education and advice, crime prevention, security, etc. Examples of "physical support" include offering one's seat, carrying heavy baggage, pulling a hand of an elderly person crossing a crosswalk etc., and the like. In addition, examples of "volunteer (job)" include helping taking copies in job, helping creation of documents, and the like. In addition, examples of "volunteer (friend)" include helping house-moving, taking care of a friend's child, and the like. In addition, examples of "offer" include presenting something, giving a treat, inviting to a house, and the like. In addition, examples of "education and advice" include teaching study, giving an advice, and the like. In addition, examples of "crime prevention/security" include helping a person being pestered by a rascal, calling an ambulance for a person who has fallen to the ground, and the like.

The database access unit 202 performs data reading/writing and search on the KUUID database 22. For example, the database access unit 202 stores act information with a KUUID acquired (generated) by the act information acquisition unit 201 in the KUUID database 22. In addition, the database access unit 202 reads act information read from the KUUID database 22 or a two-way list described later, and outputs it to the list update unit 203, the determination unit 204, the visualization processing unit 205, and the like.

The list update unit 203 generates and updates a two-way list indicating relation between pieces of act information. The two-way list generated by the list update unit 203 is accumulated in the KUUID database 22 by the database access unit 202. The two-way list indicates relation of which act information has exerted influence on which act information. For example, the two-way list includes "nodes" including respective KUUIDs of certain act information and its parent act information and child act information, where a parent is act information from which the certain act information has received influence, and a child is act information on which the certain act information has exerted influence. In addition, when new act information is acquired by the act information acquisition unit 201, the list update unit 203 updates the two-way list on the basis of the act information.

Figure 8:
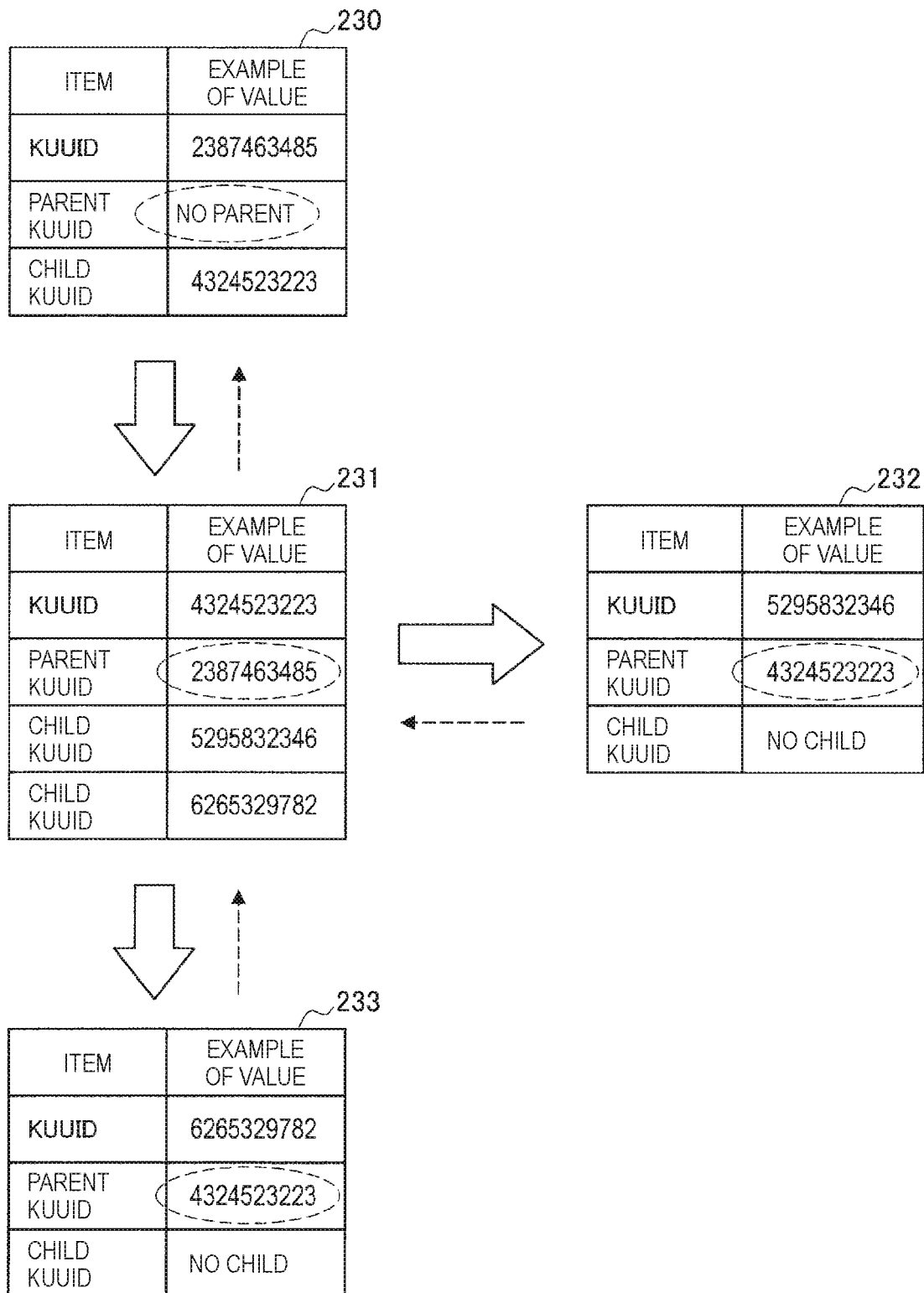
FIG. 8 illustrates an example of a two-way list according to the present embodiment.

Here, FIG. 8 illustrates an example of a two-way list. As illustrated in FIG. 8, the two-way list includes nodes 230 to 233 associated by parent-child relationships. Each node includes one KUUID, and a parent KUUID and a child KUUID of the KUUID. "None" is written in the case where no related KUUID exists. In the illustrated example, in the case where user B receives an act of kindness (KUUID: 2387463485) from user A, for example, the list update unit 203 generates the node 230.

Then, in the case where user C receives an act of kindness (KUUID: 4324523223) from user B, the list update unit 203 determines that the act is an act influenced by the act (KUUID: 2387463485) from user A received by the agent, user B, in the past, generates the new node 231, and updates the related node 230. Specifically, the list update unit 203 adds "child KUUID: 4324523223" indicating an influenced action of another user, to the node 230. In addition, the new node 231 includes the allocated own KUUID: 4324523223, and "parent KUUID: 2387463485" indicating another user's action from which influence has been received.

Which act among acts received by user B in the past has exerted influence on (is related to) the act of this time may be determined on the basis of whether or not act categories or act subcategories match, for example. In addition, temporal limitation such as within the past one month may be set on the basis of dates and times of acts received in the past.

Next, in the case where user C performs, on user D and user E, an act of kindness influenced by the act received from user B, the list update unit 203 similarly performs update of the node 231 (addition of "child KUUID: 5295832346" and "child KUUID: 6265329782") and generation of the node 232 of act information received by user D and the node 233 of act information received by user E.

As described above, in the present embodiment, a two-way list is updated and generated by using a KUUID allocated to each piece of act information.

The determination unit 204 traces "parent KUUID" on the basis of the two-way list, tracks propagation of acts, and determines whether or not an act performed in the past has returned to the same user. For example, in the case of tracking an act received by user D illustrated in FIG. 8, first, "parent KUUID: 4324523223" of the node 232 is traced, and "KUUID: 4324523223" is seen, where there is "parent KUUID: 2387463485"; thus, this is traced, and "KUUID: 2387463485" is seen, where there is "parent KUUID: no parent". Thus, search ends here. The determination unit 204 can determine that an act of kindness has returned to user D in the case where the "agent ID" indicates user D in the respective pieces of act information corresponding to the traced "KUUID: 4324523223" and "KUUID: 2387463485". However, in order to exclude a case where acts of kindness are repeated between two persons, the agent: user D may be made to be found in act information earlier than parent act information of the act information received by user D (in the example illustrated in FIG. 8, "KUUID: 2387463485" or earlier).

The visualization processing unit 205 visualizes the whole or part of act information recorded in the KUUID database 22. Specifically, the visualization processing unit 205 generates a display screen indicating a tracking (search) result of propagation performed by the determination unit 204. This makes it possible to intuitively grasp, for example, how much acts of kindness performed up to now by a specific user have propagated at present, what propagation path an act of kindness received by a specific user has traced, and the like. A method for visualization is not particularly limited; examples of specific display screens are described later with reference to FIGS. 14 to 16.

In addition, the visualization processing unit 205 may provide html or a script that can be displayed by a client browser provided by a Web server. In this case, physical visualization processing may be actually performed by a browser of the client terminal 1. In addition, the server 2 may transmit a two-way list of KUUIDs and each piece of act information to the client terminal 1, and tracking of propagation and visualization processing may be performed on the client terminal 1 side.

The transmission control unit 206 performs control to transmit, from the communication unit 21 to the client terminal 1, visualized data (e.g., screen display data) generated by the visualization processing unit 205. In addition, when it is found by the determination unit 204 that an act of kindness has returned to a specific user, the transmission control unit 206 transmits, from the communication unit 21 to the client terminal 1, notification information for notifying the user that the act of kindness has returned. In addition, notification by the transmission control unit 206 is not limited to a case where an act of kindness has returned to a specific user; for example, notification may be made depending on conditions such as a case where the number of people to which an act of kindness performed by a certain user has propagated reaches a predetermined value or a case where the act of kindness has propagated to a specific person.

The communication unit 21 is a communication module for transmitting and receiving data to and from another device in a wired/wireless manner. For example, the communication unit 21 connects to the client terminal 1 via the network 3, and transmits and receives data.

The KUUI database 22 is a storage unit that holds act information to which a KUUID is allocated and a two-way list using a KUUID.

Note that the server 2 includes a storage unit that is implemented by a read only memory (ROM) that stores programs, operation parameters, or the like used in processing by the control unit 20, and a random access memory (RAM) that temporarily stores parameters that change as appropriate or the like, and the KUUI database 22 is held in part of a storage area of the storage unit. The storage unit includes a storage device including a storage medium, a recording device for recording data on the storage medium, a reader device for reading out data from the storage medium, a deletion device for deleting data recorded on the storage medium, and the like.

3. EXAMPLES

Now, specific examples of an information processing system according to the present embodiment will be described with reference to drawings.

3-1. First Example

First, in a first example, propagation of an act of kindness of taking care of a friend's child is described. A mother bringing up a child uses most of her time in daily life for taking care of a small child, and has trouble finding places and time for letting the child play. Therefore, mothers in the same region invite each other to their houses and let their children play together, temporarily take care of each other's child, and so on. These are acts of kindness that mothers appreciate greatly.

Here, as an example, description is given on a case where user F who is a homemaker entrusts her child to a friend, user G who is a homemaker (user F receives an act of kindness of being entrusted to care for the child from user G).

(Operation Processing of Client Terminal 1)

Figure 9:
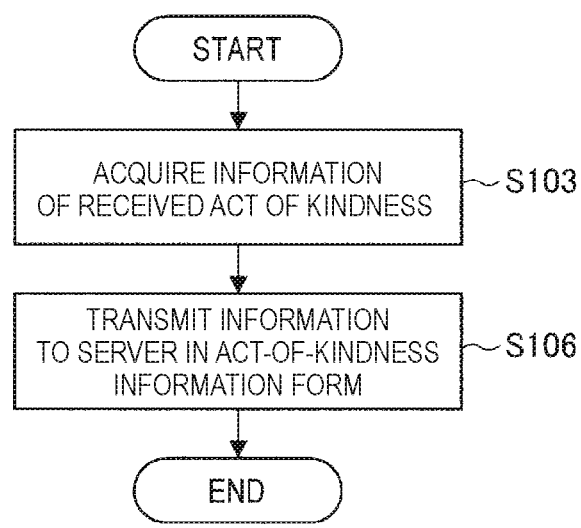
FIG. 9 is a flowchart illustrating operation processing in a client terminal according to the present embodiment.

FIG. 9 is a flowchart illustrating operation processing in a client terminal 1F of user F. As illustrated in FIG. 9, first, the client terminal 1F acquires information of an act of kindness that is received (step S103). For example, the client terminal 1F acquires audio data, a captured image, sensor data, position information, and the like obtained while user G is entrusted to care for user F's child. For example, the client terminal 1F automatically detects that user F has entrusted her child to user G on the basis of person identification and voice recognition using the camera 14 and the audio input unit 13. At this time, using position information in combination makes it possible to more reliably find that user F has gone to user G's house. Alternatively, the client terminal 1F performs text analysis on e-mails, SNS, messengers, etc. exchanged between user F and user G, grasps that user F plans to visit user G's house to entrust her child, and detects that an act of kindness has been received in the case where user F is present near user G's house on the basis of position information around the planned time. In addition, information of the received act of kindness may be manually input by a user (e.g., inputting text such as "I entrusted my child to user G").

Next, the client terminal 1 transmits information of an act of kindness received by user F to the server 2 in a predetermined act-of-kindness information form (step S106). The predetermined act-of-kindness information form is a data configuration including an agent ID, a patient ID, date and time, position information, an act category, and the like.

In the present example, the agent ID corresponds to an ID of user G who has been entrusted to care for the child, the patient ID corresponds to an ID of user F who has received kindness, and the date and time correspond to date and time of occurrence of the act. In addition, the act category is "kindness", the act subcategory is "volunteer (friend/acquaintance)", and the act detail is "taking care of a friend's child". Note that instead of making determination up to the act category, the client terminal 1 may additionally send audio data, a captured image, sensor data, and the like and an action recognition result.

(Operation Processing of Server 2)

Figure 10:
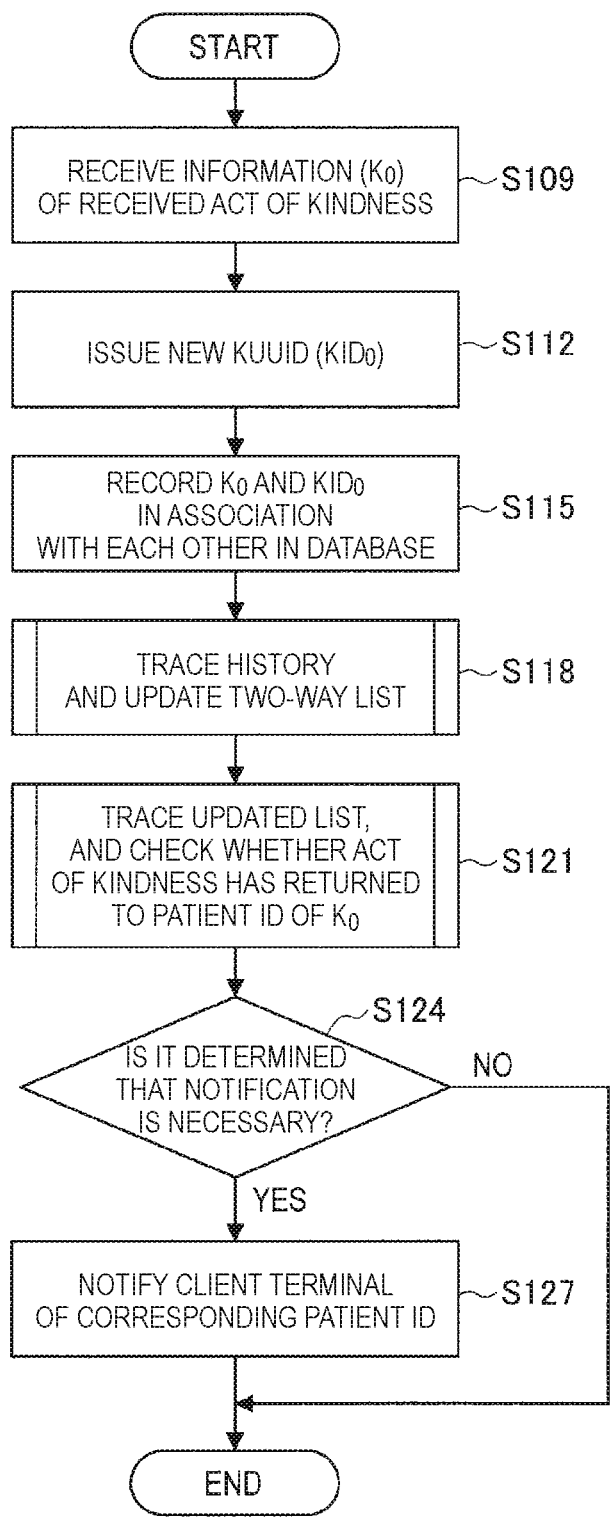
FIG. 10 is a flowchart illustrating operation processing in a server according to the present embodiment.

FIG. 10 is a flowchart illustrating operation processing in the server 2 according to the present embodiment. As illustrated in FIG. 10, first, the act information acquisition unit 201 of the server 2 receives act-of-kindness information $K_0$ transmitted from the client terminal 1F (step S109), then issues a new KUUID ($KID_0$) (step S112), and records the new KUUID in the KUUID database 22 through the database access unit 202 in association with act-of-kindness information (step S115). At this time, the act information acquisition unit 201 can perform determination of an act category and an act subcategory, or the like, and complement a lacking portion of received act-of-kindness information if any. Alternatively, the operation processing may be operation processing of organizing (generating) act-of-kindness information on the act information acquisition unit 201 side, instead of the client terminal 1 side.

Next, the list update unit 203 updates a two-way list (step S118). As described with reference to FIG. 8, a plurality of nodes of the two-way list may be updated. Two-way list update processing is described later with reference to FIG. 11.

Then, the determination unit 204 traces "parent KUUID" of the updated two-way list, and checks whether or not an act of kindness has returned to the patient ID (the ID of user F) of the act-of-kindness information $K_0$ of this time (whether the ID of user F is included in agent IDs) (step S121). If user F exists as an agent in the traced two-way list, it can be said that an act of kindness of user F similarly inviting a friend and being entrusted to care for a child in the past has propagated and returned to user F herself this time. In this case, the determination unit 204 determines that notification to user F is necessary. Note that details of such determination processing are described later with reference to FIG. 12.

Then, in the case where it is determined that notification is necessary (Yes in step S124), the transmission control unit 206 notifies the client terminal 1F of the corresponding patient ID (user F) that the act of kindness has returned (step S127).

The operation processing according to the present embodiment has been specifically described. Now, the two-way list update processing illustrated in step S118 and the determination processing illustrated in step S121 will be described in detail in order with reference to FIGS. 11 and 12.

Two-Way List Update Processing

Figure 11:
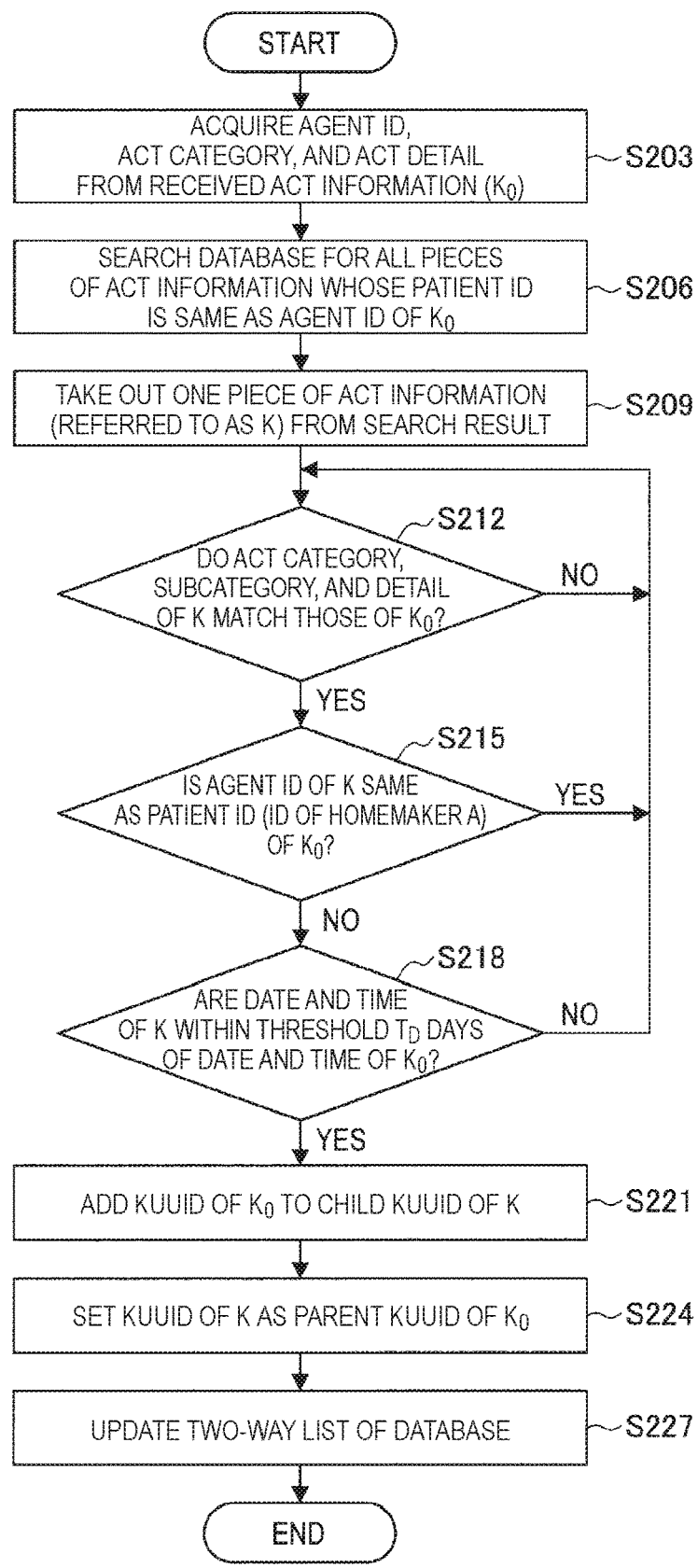
FIG. 11 is a flowchart illustrating two-way list update processing according to the present embodiment.

FIG. 11 is a flowchart illustrating two-way list update processing according to the present embodiment. As illustrated in FIG. 11, first, the list update unit 203 acquires an agent ID, an act subcategory, an act category, and an act detail from the received act information $K_0$ (step S203).

Next, the list update unit 203 searches the KUUID database 22 for all pieces of act information whose patient ID is the same as the agent ID of the act information $K_0$ (step S206). That is, the list update unit 203 searches for act information related to an act received by user F in the past.

Then, the list update unit 203 takes out one piece of act information (referred to as act information K) from a search result (step S209), and determines whether or not an act category, an act subcategory, and an act detail of the act information K match those of the act information $K_0$ (step S212).

Next, in the case where it is determined that the category and the like match those of the act information $K_0$ (Yes in step S212), the list update unit 203 determines whether or not the agent ID of the act information K is the same as the patient ID (ID of user F) of the act information $K_0$ (step S215). Thus, in the present embodiment, a case where two persons alternately perform acts of kindness for each other is excluded. This is because in such a case, it hardly can be said that an act of kindness has returned to oneself via a third person.

Then, in the case where it is determined that the IDs are not the same (No in step S215), the list update unit 203 determines whether or not date and time of the act information K are within threshold TD days of date and time of the act information $K_0$ (step S218). Here, related act information K that has exerted influence on the user's action is searched for, but too old act information K is excluded, because it has been forgotten by the user and can hardly be said to have exerted influence. Note that the threshold TD may be changed for each category or act detail.

Next, in the case where the act information K is within the threshold TD days (Yes in step S218), the list update unit 203 adds a KUUID of the act information $K_0$ as a child KUUID of the act information K (step S221).

Then, the list update unit 203 adds a KUUID of the act information K as a parent KUUID of the act information $K_0$ (step S224).

Then, the list update unit 203 updates the two-way list of the KUUID database 22 (step S227). That is, the list update unit 203 may update association between the two-way lists as illustrated in FIG. 8, on the basis of the added parent KUUID and child KUUID.

Determination Processing

Figure 12:
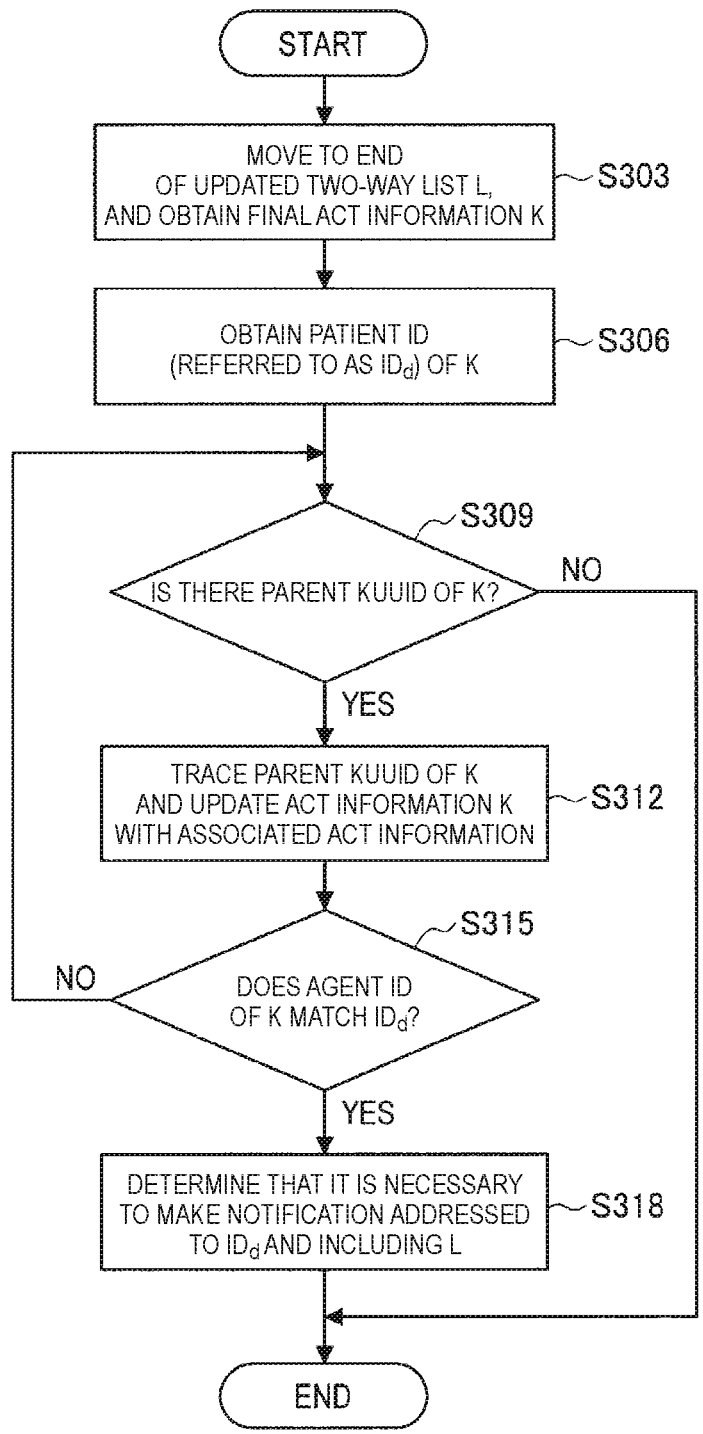
FIG. 12 is a flowchart illustrating determination processing according to the present embodiment.

FIG. 12 is a flowchart illustrating determination processing according to the present embodiment. As illustrated in FIG. 12, first, the determination unit 204 moves to the end of an updated two-way list L, and obtains final act information K (step S303). For example, in the two-way list L as illustrated in FIG. 8, in the case where the node 231 and the node 233 are updated, act information at the end of the two-way list L, that is, corresponding to "KUUID: 6265329782" (node 233) of "child KUUID: none", is acquired as act information K.

Next, the determination unit 204 obtains a patient ID ($ID_d$) of the act information K (step S306).

Then, the determination unit 204 determines whether or not there is a parent KUUID of the act information K (step S309), and in the case where there is (Yes in step S309), traces the parent KUUID and updates the act information K with associated act information (step S312). For example, in the example illustrated in FIG. 8, in the case where act information of the node 233 is K, act information of the node 231 is obtained as K by tracing the parent KUUID.

Next, the determination unit 204 determines whether or not an agent ID of the act information K acquired by tracing the parent KUUID matches the patient $ID_d$ of the final act information acquired in step S306 (step S315).

In the case where the agent ID does not match the patient $ID_d$ (No in step S315), the determination unit 204 acquires act information K by further tracing a parent KUUID (in the example illustrated in FIG. 8, act information of the node 230, for example), and checks the ID again (steps S309 to S315 are repeated). In the case where a matching ID is not found (No in step S309) even by tracing up to act information without a parent KUUID by repeating steps S309 to S315, it cannot be said that an act of kindness has returned; hence, the determination unit 204 ends the determination processing.

On the other hand, in the case where the agent ID matches the patient $ID_d$ (Yes in step S315), it can be said that an act of kindness has returned to a user; hence, the determination unit 204 determines that it is necessary to make a notification addressed to the patient $ID_d$ of the final act information (in the present example, user F who has received an act of kindness this time), and including the two-way list L (for example, a two-way list in which a plurality of nodes are connected as illustrated in FIG. 8) (step S318).

(Notification Screen Example)

Now, examples of notification screens displayed by the client terminal 1 will be described with reference to FIGS. 13 to 16. As described above, in the case where the determination unit 204 determines that notification is necessary (Yes in step S124), the transmission control unit 206 notifies the client terminal 1 of the corresponding patient that an act of kindness has returned (step S127).

Figure 13:
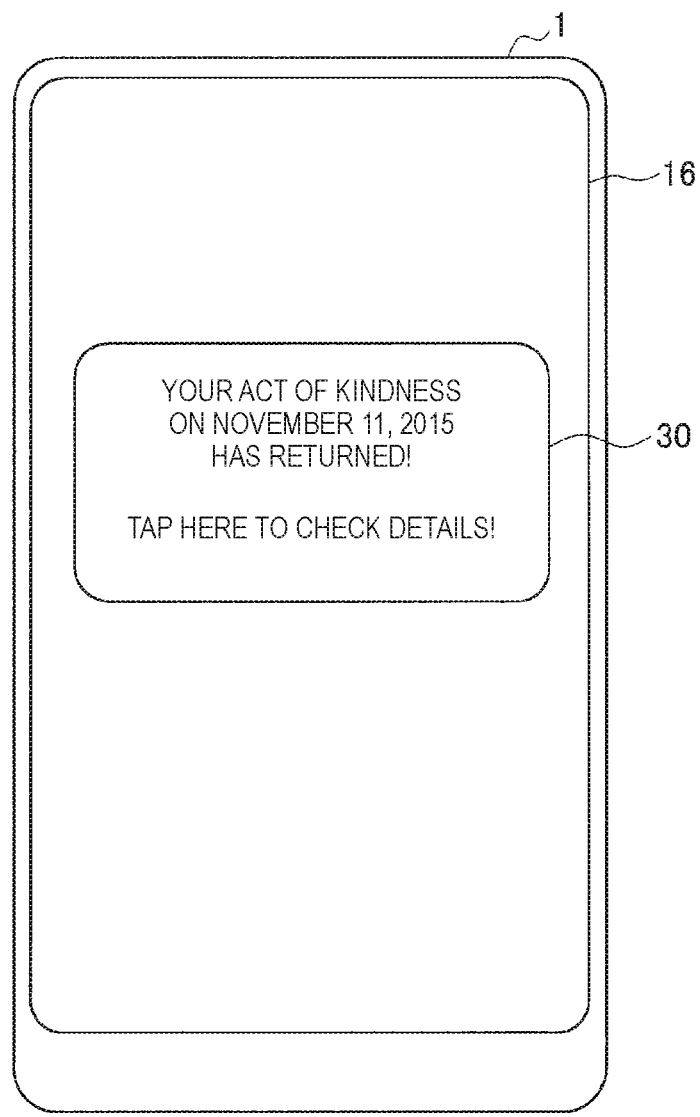
FIG. 13 illustrates an example of a notification screen according to the present embodiment.

FIG. 13 illustrates an example of a notification screen according to the present embodiment. When notification is transmitted to the client terminal 1 from the server 2, a notification screen 30 as illustrated in FIG. 13 is displayed on the display unit 16 of the client terminal 1. When a user taps the notification screen 30, a detail screen is displayed.

Figure 14:
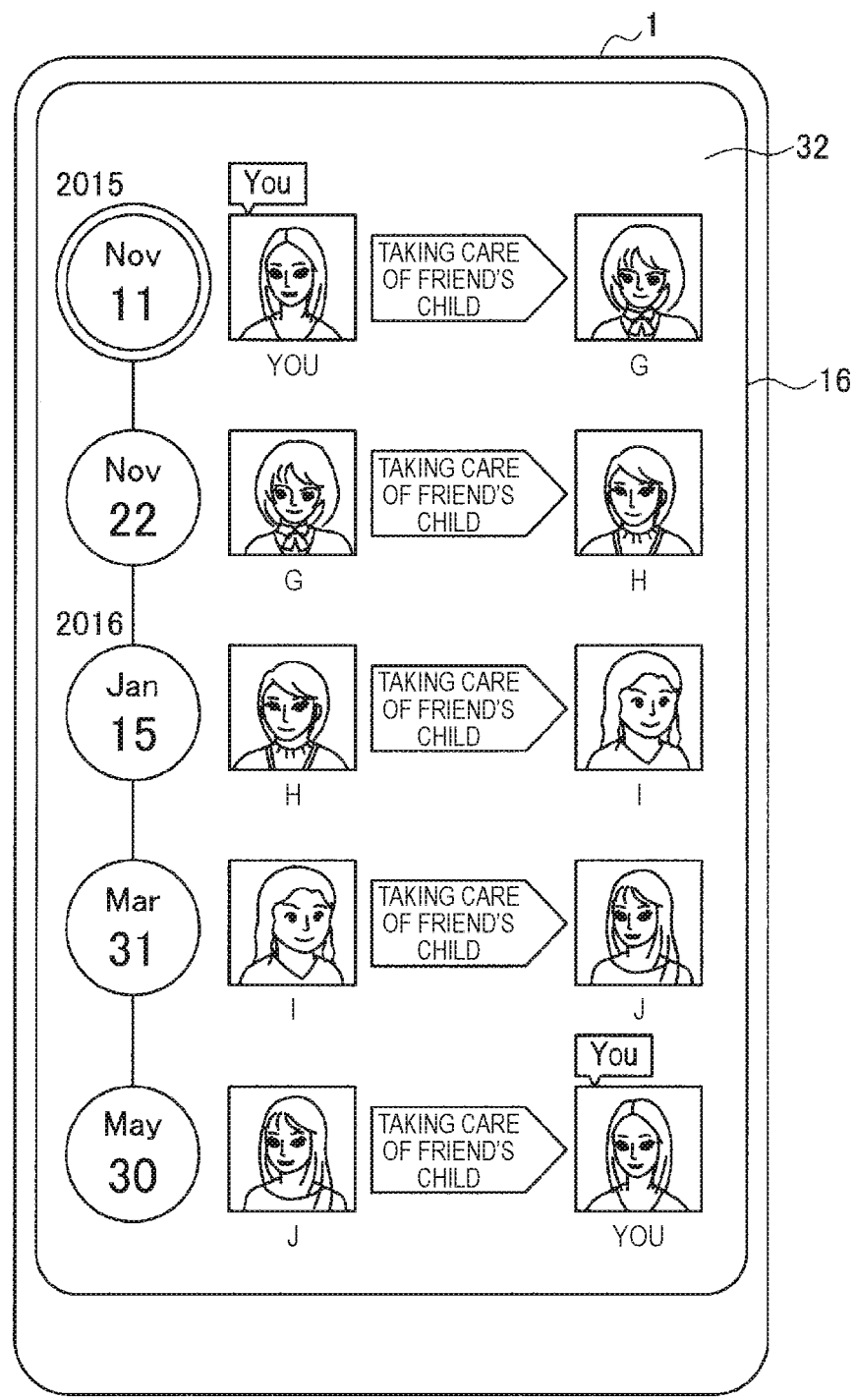
FIG. 14 illustrates an example of a notification detail screen according to the present embodiment.

FIG. 14 illustrates an example of a detail screen. As illustrated in FIG. 14, on a notification detail screen 32, dates, person icons, and arrows indicating paths show along what path (via whom) an act of kindness performed by a user has returned. This enables the user to intuitively grasp via whom an act of kindness has returned to the user him/herself and when the user performed the act of kindness.

Note that the client terminal 1 may display such a detail screen on the basis of data for screen display generated by the server 2, or may generate and display such a detail screen on the basis of a two-way list or act information transmitted from the server 2. In addition, the visualization processing unit 205 on the server 2 side may prepare necessary data (HTML, CSS, script language, etc.) in accordance with a request from the client 1 side, and the client may perform only rendering.

In addition, a notification detail screen according to the present embodiment is not limited to the example illustrated in FIG. 14, and may be another example as described next.

For example, only paths of return to the user him/herself are displayed on the notification detail screen 32 illustrated in FIG. 14; however, the user may want to know how the act of kindness has propagated to others. Hence, as illustrated in a notification detail screen 34 in FIG. 15, for example, paths of acts of kindness that have propagated from the user, including paths other than those returning to the user him/herself, can be indicated by arrows and person icons, which enables the user to intuitively grasp how the user's own act of kindness has propagated. In the example illustrated in FIG. 15, paths of return to the user him/herself are displayed with bold arrows. In addition, in the example illustrated in FIG. 15, friends connected to the user by SNS are displayed by face icons (icons set by the friends), and people not connected are displayed by dummy icons; however, all users may be displayed by face icons etc.

In addition, as another example of the notification detail screen, a notification detail screen is assumed in which, using position information included in act information, an icon indicating the place of occurrence of an act of kindness is displayed superimposed on a map, and a propagation path of the act of kindness is indicated by an arrow.

Figure 16:
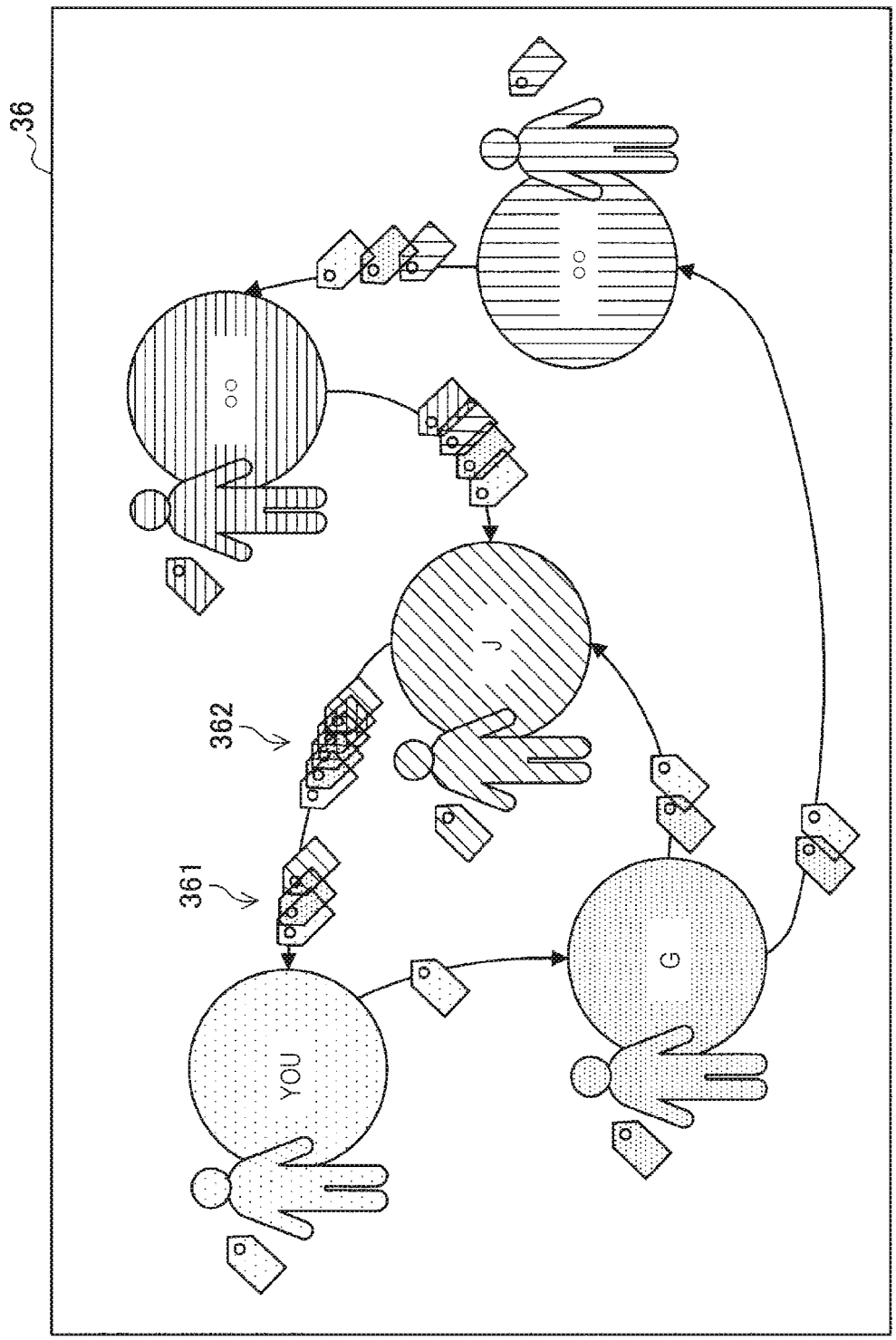
FIG. 16 illustrates another example of a notification detail screen according to the present embodiment.

Furthermore, as another example of the notification detail screen, a screen example expressing a state where tags (e.g., agent IDs) corresponding to agents of acts of kindness that have occurred are added, as illustrated in FIG. 16, may be employed. On a notification detail screen 36 illustrated in FIG. 16, each time an act of kindness that has occurred from oneself propagates to friend G and to friend J, one's own tag, friend G's tag, and friend J's tag are added and displayed. This enables the user to intuitively find that the user's own act has returned, because the user's own tag is included in a tag group 361 of acts of kindness received from friend J. Note that in the example illustrated in FIG. 16, there is one more propagation path of acts of kindness received from friend J, and a tag group 362 indicating the other propagation path includes tags of the user, friend G, another person ○ ○, another person ○○, and friend J, which enables the user to intuitively find that the user's own act has returned also along another propagation path.

3-2. Second Example

Next, more flexible propagation of kindness is described. In the first example described above, description is given on an example in which the completely same act of kindness propagates from an agent to a patient, on the basis of a kindness category, a subcategory, and an act detail of act information; however, the present disclosure is not limited to this.

For example, it is assumed that a daughter who is with an elderly person who has had a seat offered in a train receives influence, comes to be further aware that "I too should be kind to elderly people", and helps another elderly person in another scene. In this case, the daughter may perform another act of kindness such as carrying heavy baggage of another elderly person or pulling a hand of another elderly person crossing a crosswalk in another scene.

Hence, in the second example, a person influenced by an act of kindness that an agent has performed for a patient is also defined as a "patient" in a broad sense. Thus, as illustrated in FIG. 1, for example, user C influenced by the act of kindness performed for the elderly person is also regarded as a "patient", and generation of act information and update of a two-way link are performed; thus, it is determined that user A's act of kindness has propagated.

In addition, as described above, even if acts of kindness are not completely the same, when having determined propagation as related propagation, the list update unit 203 associates the act of kindness and updates the two-way link, thereby enabling propagation of the act to be traced. To enable processing of determining propagation as related propagation, the list update unit 203 may, for example, determine that the same type of kindness has propagated as long as the act subcategory is the same, even if act details are different. Accordingly, an act subcategory includes only highly related ones. For example, examples of a physical support subcategory include "offering one's seat, carrying baggage, pulling a hand, and operating equipment".

In addition, in the case of having a seat offered in a train, a partner (agent) is often an unacquainted person, unlike the case of entrusting a child to a friend as illustrated in FIG. 1, and how to acquire an agent ID is a problem. In the present example, some examples may be given as follows. A methods of acquiring an ID (agent ID) of the client terminal 1 shaken or hit at substantially the same place from position information of the client terminals 1 managed by the server 2, by shaking or lightly hitting the client terminals 1 with each other, for example. In addition, a method of automatically matching, on the server 2 side, two events pressed at the same time at the same place, by an agent and a patient of an act of kindness pressing a dedicated button of the same application or wearable device.

In addition, in the case of additionally considering flexible propagation of kindness according to the present example, in the two-way list update processing illustrated in FIG. 11, the determination processing condition in step S212 is changed to "determine whether or not act category and act subcategory of act information K match those of act information $K_0$".

(Other Examples of Determination Condition for Number of Days that have Passed)

As an example of considering more flexible propagation of kindness, the determination processing condition "are date and time of act information K within threshold TD days of date and time of act information $K_0$" in step S218 of FIG. 11 may be determined by another method. In the determination processing condition, a threshold TD is set, and past acts of kindness from which a certain number of days or more have passed are excluded; however, the present disclosure is not limited to this. For example, instead of simple exclusion depending on the number of days, a damping value may be calculated from the number of days that have passed, and determination may be made depending on whether or not the damping value is greater than a threshold.

For example, damping curves with different slopes can be created by adjusting a coefficient a, by using the following formula 1.

[Math. 1]

$$y = e^{-ax} \qquad \text{formula 1}$$

Figure 17:
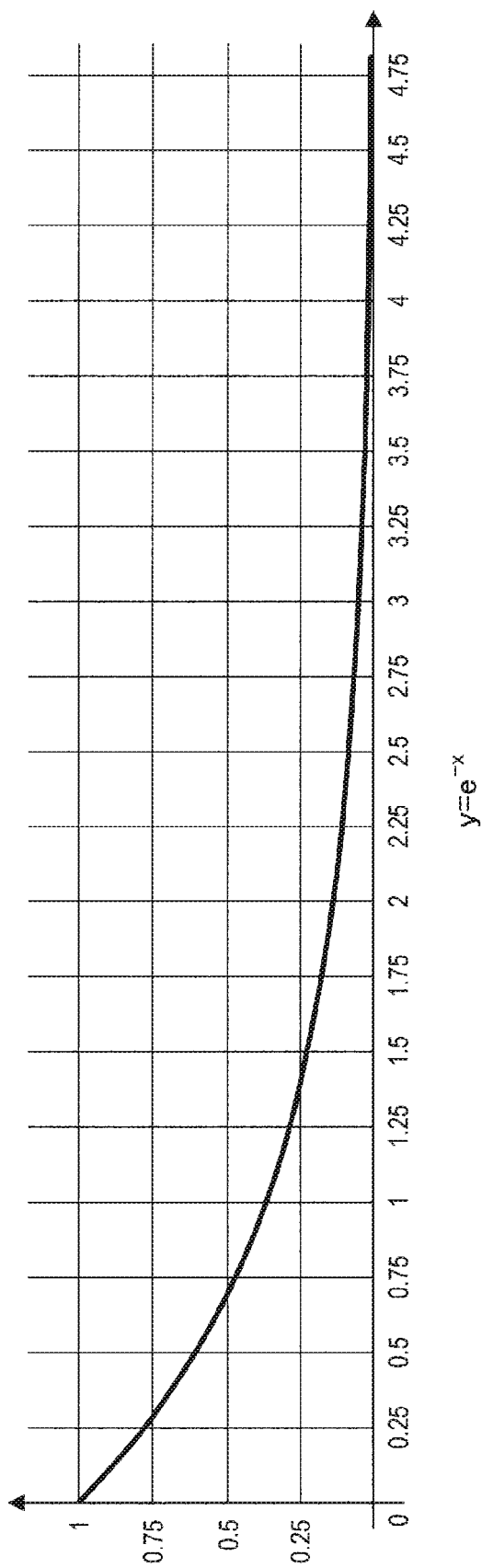
FIG. 17 illustrates a graph of a damping value according to the present embodiment.
Figure 18:
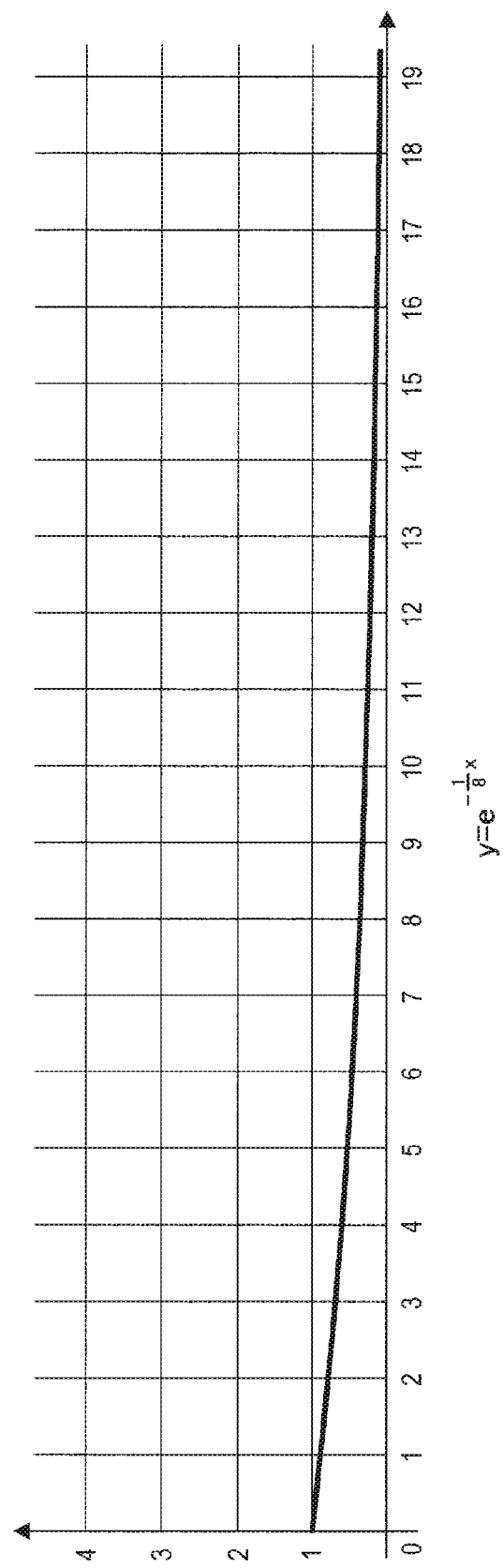
FIG. 18 illustrates a graph of a damping value according to the present embodiment.

Here, FIGS. 17 and 18 illustrate examples of a graph of a damping value obtained by adjusting the coefficient a. FIG. 17 shows a damping value based on the following formula 2, and FIG. 18 shows a damping value based on the following formula 3.

[Math. 2]

$$y = e^{-x} \qquad \text{formula 2}$$

[Math. 3]

[Math. 3]

$$y = e^{-\frac{1}{8}x} \qquad \text{formula 3}$$

In this case, when a threshold is set to 0.01, for example, y falls below the threshold in the case where five days pass in the graph illustrated in FIG. 17, whereas y does not fall below 0.01 until 36 days pass in the graph illustrated in FIG. 18.

In addition, a more simple linear equation of y=ax (a<0) can be used; however, in the case where an exponential function is used, a curve can be created in which damping proceeds rapidly as time passes, and damping proceeds gradually after a certain period of time passes; hence, it can be said that the curve feels closer to memory sense of human (closer to the Ebbinghaus forgetting curve).

In addition, the coefficient a in the above formula 1 may be changed for each act detail. For example, since an act of offering one's seat is performed relatively on a day-to-day basis, the act is made less likely to be linked with an act of kindness performed at a later date by passage of some days, by making the coefficient larger. In addition, a large event such as helping a person being attacked by a rascal keeps remaining in the patient's memory, and the patient should be strongly impressed when meeting a person under the same situation; hence, a damping curve of such an act may be made gradual by reducing the coefficient a to prevent damping for several years or several tens of years, or may be kept from becoming equal to or less than a certain value by adding a constant b as in the following formula 4.

[Math. 4]

$$y = e^{-ax} + b \qquad \text{formula 4}$$

3-3. Third Example

Figures 19, 20:
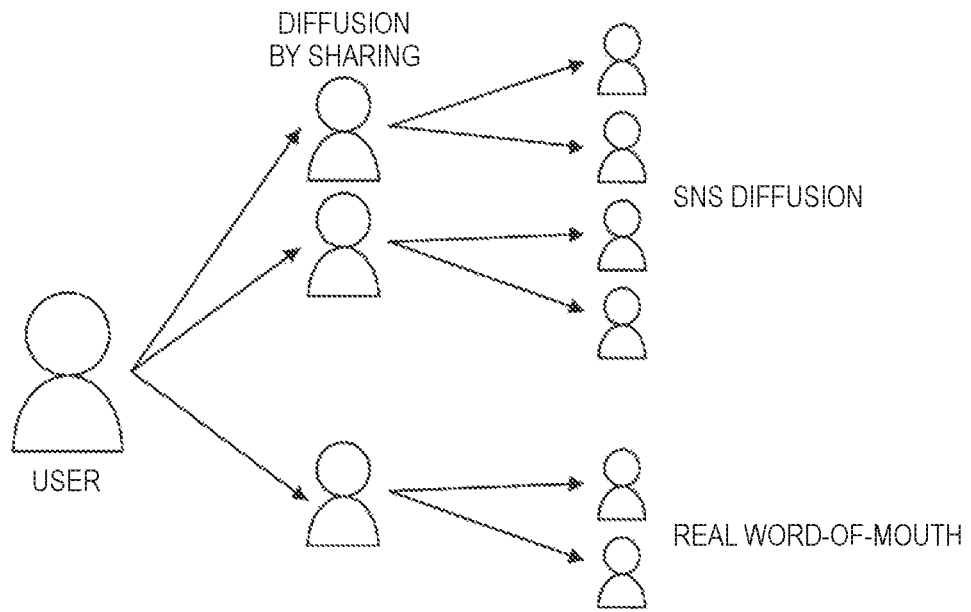
FIG. 19 is a schematic diagram for describing word-of-mouth propagation according to the present embodiment.
FIG. 20 illustrates an example of act information of word of mouth according to the present embodiment.

In addition, the present embodiment can be applied to visualization of propagation of word of mouth as well as propagation of acts such as acts of kindness. FIG. 19 is a schematic diagram for describing word-of-mouth propagation. As illustrated in FIG. 19, word of mouth may include word of mouth using SNS, as well as word of mouth in real conversations. Word of mouth using SNS propagates faster and in a wider range than real word-of-mouth. In addition, IDs of SNS have already been issued to people using SNS, which makes it possible to reliably track whose word of mouth has propagated by propagation to whom.

Specific items that propagate by word of mouth mainly include personal recommendations such as "that movie was interesting", "that song is wonderful", and "the Ramen there is very delicious". An item that propagates is a specific song title or store name (or a store name and a menu name), and the specific content name is put also in an act detail. Here, FIG. 20 illustrates an example of act information according to the present embodiment.

As illustrated in FIG. 20, in the case of an act category "word of mouth", specific information such as a store name is put in as an act detail.

Figure 15:
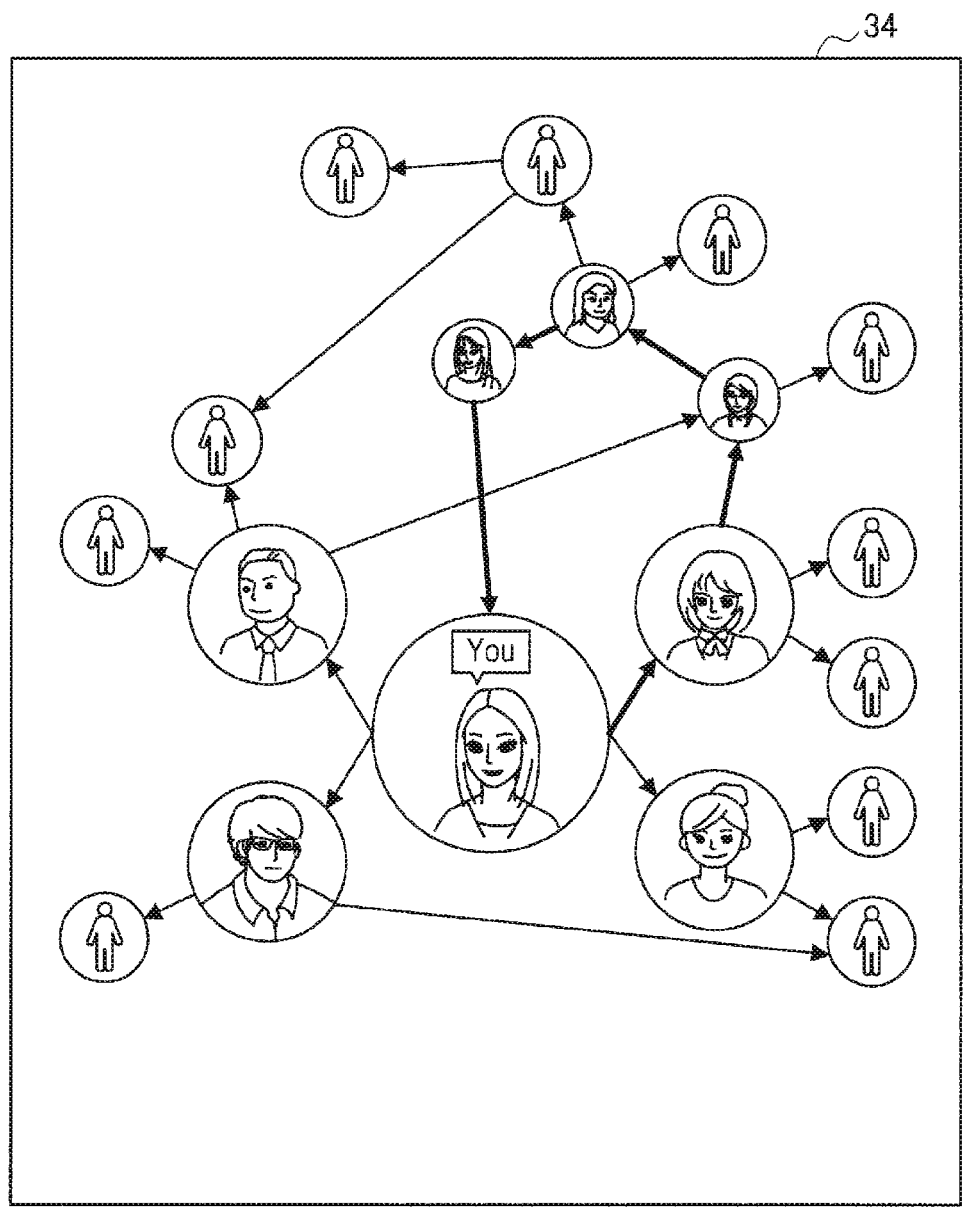
FIG. 15 illustrates another example of a notification detail screen according to the present embodiment.

In addition, in the case of propagation of word of mouth, it is assumed that a larger number of users want to know the degree of spread rather than return of the word of mouth to oneself. In the present example, a two-way list is generated on the basis of word-of-mouth acts; thus, a user can always see a schematic diagram visualizing propagation of acts as illustrated in FIGS. 15 and 19, and intuitively specify, for example, an influencer or the current degree of spread of one's word of mouth. Note that in the case where SNS is used, information is provided to an indefinite number of people, instead of performing an act for a specific patient, unlike in the first and second examples described above.

(Operation Processing)

Operation processing in real word-of-mouth is performed in a manner similar to that described with reference to FIGS. 9 to 12.

Figure 21:
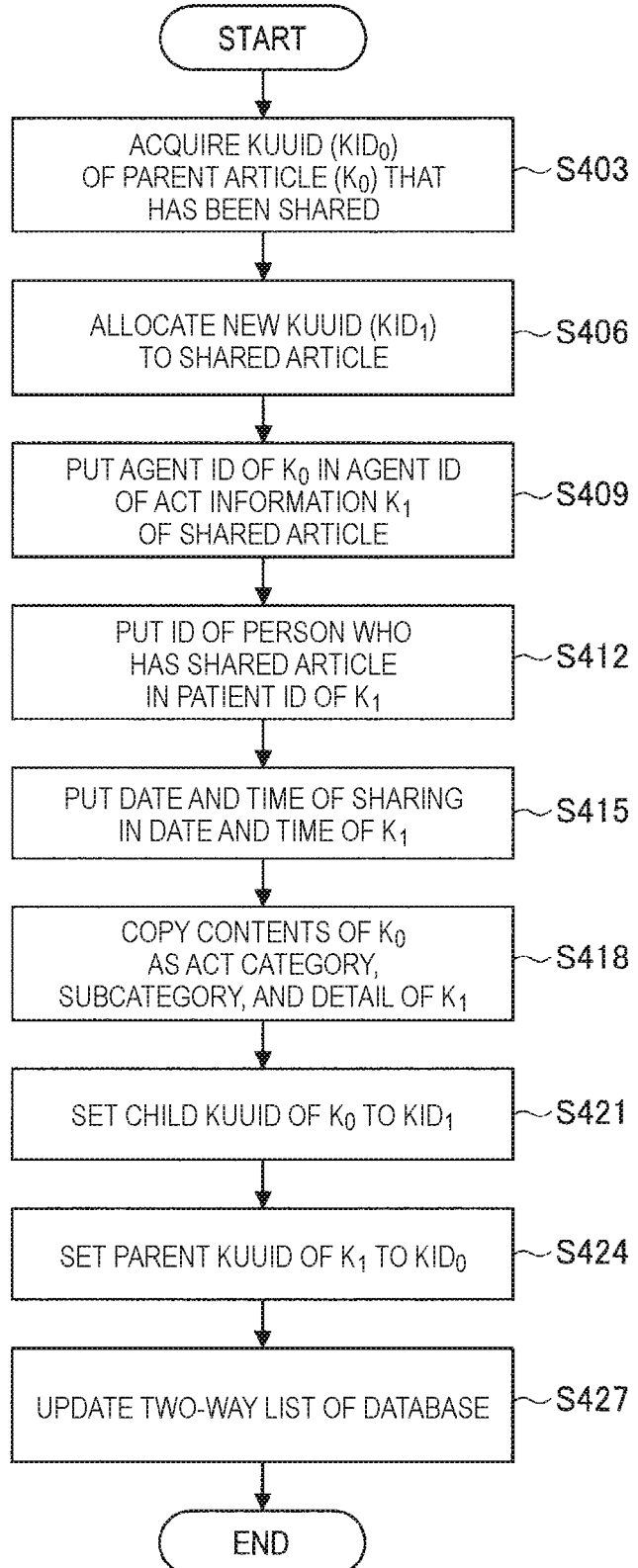
FIG. 21 is a flowchart illustrating database update processing in word-of-mouth propagation using SNS according to the present embodiment.

On the other hand, two-way list update processing in word-of-mouth propagation using SNS is described with reference to FIG. 21. FIG. 21 is a flowchart illustrating database update processing in word-of-mouth propagation using SNS according to the present embodiment.

As illustrated in FIG. 21, first, the act information acquisition unit 201 acquires a KUUID (KID$_0$) of a parent article (K$_0$) that has been shared (step S403). For example, assuming that a person who has shared a certain word-of-mouth article is X and a person who has written (or shared) a parent particle that is a source of sharing is Y, the agent is X and the patient is Y. This is based on the idea that Y told the word of mouth to X at a point in time when X shared the article. Actually, word of mouth goes to an indefinite number of people at a point in time when Y made the article public on SNS; however, in terms of propagation of word of mouth, attention should be turned to an act of seeing the article and further spreading word of mouth.

Next, the act information acquisition unit 201 allocates a new KUUID (KIM) to the shared article (step S406).

Then, the act information acquisition unit 201 puts an agent ID of the parent particle (K$_0$) in an agent ID of act information Ki of the shared article (step S409).

Next, the act information acquisition unit 201 puts an ID of a person who has shared the article in a patient ID of the act information Ki of the shared article (step S412).

Then, the act information acquisition unit 201 puts date and time of sharing in date and time of the act information Ki of the shared article (step S415).

Next, the act information acquisition unit 201 copies contents of the parent article (K$_0$) as an act category, a subcategory, and an act detail of the act information Ki (step S418).

Then, the list update unit 203 sets a child KUUID of the parent article (K$_0$) to KIM (step S421).

Then, the list update unit 203 sets a parent KUUID of the act information Ki to KID$_0$ (step S424).

Then, the list update unit 203 updates two-way list information of the KUUID database 22 (step S427). That is, the list update unit 203 updates association in two-way list information as illustrated in FIG. 8 on the basis of the added parent KUUID and child KUUID.

4. CONCLUSION

As described above, the information processing system according to the embodiment of the present disclosure makes it possible to grasp propagation of acts in a society.

In the present embodiment, recording propagation of acts makes it possible to find that a predetermined act given to a person has returned to oneself, and grasp how a certain act has spread in a community, or the like.

In addition, visualization of propagation of acts according to the present embodiment makes it possible to honor a person who is making a good contribution to a society, and can be used in personnel affairs of a company or evaluation of personality in a marriage agency.

In addition, receiving a notification that an act of kindness or the like that one has performed in the past has returned via a third person can satisfy an appetite for contribution to society, and serve as motivation to keeping doing acts of kindness.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, a computer program for causing hardware such as a CPU, ROM, and RAM built in the client terminal 1 or the server 2 described above to exhibit functions of the client terminal 1 or the server 2 can also be produced. Furthermore, a computer-readable storage medium in which the computer program is stored is also provided.

In addition, in the first example described above, a case where acts of kindness are repeated between two persons is excluded; however, the present disclosure is not limited to this, and may include a case where acts of kindness are exchanged in propagation of acts.

In addition, tampering of act information and a two-way list can be prevented by using a blockchain mechanism. That is, a system configuration may be employed in which a network difficult to break or tamper is constructed by distributedly managing a two-way list by individual client terminals 1 storing and sharing it.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing system including:

a communication unit configured to acquire act information indicating occurrence of a first act from a first user to a second user;

an accumulation unit configured to accumulate at least a user who has performed the act, a user influenced by the act, and a type of the act in units of acts in order of occurrence of the acts; and a control unit configured to, when a second act determined to have influenced the first act is found from among acts that are accumulated in the accumulation unit and from which the first user has received influence in past, perform control to record the first act and the second act in association with each other in the accumulation unit.

(2)

The information processing system according to (1), in which the control unit traces associated acts in order from the first act by using information indicating association between acts accumulated in units of acts that have occurred, and when the associated acts include an act performed by the second user, generates a control signal for making a predetermined notification to the second user, and performs control to transmit the control signal to a client device corresponding to the second user via the communication unit.

(3)

The information processing system according to (1) or (2), in which when a second act estimated to have influenced the first act is found from among acts that are accumulated in the accumulation unit and from which the first user has received influence in the past, and the second act has been performed by a user other than the second user, the control unit performs control to record the first act and the second act in association with each other in the accumulation unit.

(4)

The information processing system according to any one of (1) to (3), in which when a second act estimated to have influenced the first act is found from among acts that are accumulated in the accumulation unit and from which the first user has received influence in the past, and the first act has been performed within a predetermined period of time after performance of the second act, the control unit performs control to record the first act and the second act in association with each other in the accumulation unit.

(5)

The information processing system according to any one of (1) to (4), in which the control unit generates graph data in which each user is indicated by an icon, and a direction in which an act has been performed is expressed by an arrow connecting icons, in accordance with information accumulated in the accumulation unit in units of acts that have occurred.

(6)

The information processing system according to any one of (1) to (4), in which the control unit traces associated acts in order from the first act by using information indicating association between acts accumulated in units of acts that have occurred, and when the associated acts include a third act performed by the second user, generates graph data highlighting an arrow connecting icons indicating users who have performed acts that have occurred in order from the third act performed by the second user to the first act from which the second user has received influence.

(7)

The information processing system according to any one of (1) to (6), in which the communication unit acquires the act information indicating occurrence of the first act from the first user to the second user, and position information indicating a position where the act has occurred, and the control unit generates graph data in which an icon indicating the user corresponding to each act is mapped onto a map in accordance with position information indicating a position where the act has occurred.

(8)

The information processing system according to any one of (1) to (7), in which the type of act is layered information, and when a second act that does not match the first act in lower layer information of the type of act but matches the first act in upper layer information of the type of act is found from among acts that are accumulated in the accumulation unit and from which the first user has received influence in the past, the control unit determines that the second act has influenced the first act.

(9)

The information processing system according to any one of (1) to (8), in which the act is an act of kindness.

(10)

The information processing system according to any one of (1) to (8), in which the act is a word-of-mouth act.

(11)

The information processing system according to any one of (1) to (10), in which the accumulation unit accumulates, as a list indicating association between acts, a list including an ID allocated to act information, a parent ID indicating an act from which influence has been received, and a child ID indicating an act on which influence has been exerted.

(12)

An information processing method including, by a processor:

acquiring, via a communication unit, act information indicating occurrence of a first act from a first user to a second user;

accumulating, in an accumulation unit, at least a user who has performed the act, a user influenced by the act, and a type of the act in units of acts in order of occurrence of the acts; and when a second act determined to have influenced the first act is found from among acts that are accumulated in the accumulation unit and from which the first user has received influence in past, performing control to record the first act and the second act in association with each other in the accumulation unit.

REFERENCE SIGNS LIST 1 client terminal
2 server
3 network
10 control unit
11 communication unit
12 operation input unit
13 audio input unit
14 camera
15 sensor 16 display unit
17 audio output unit
18 storage unit
19 position information acquisition unit
20 control unit
21 communication unit
22 KUUID database
30 notification screen
201 act information acquisition unit
202 database access unit
203 list update unit
204 determination unit
205 visualization processing unit
206 transmission control unit

The invention claimed is:

1. An information processing system, comprising:
    circuitry configured to:
        acquire act information that indicates occurrence of a first act of a plurality of acts from a first user of a plurality of users to a second user of the plurality of users;
        accumulate information associated with the first user, the second user, and a type of act of each of the plurality of acts in order of occurrence of the plurality of acts, wherein
            the first user performs the first act, and
            the second user is influenced by the first act;
        determine a second act from the plurality of acts based on an influence of the second act on the first act and the influence of the second act on the first user;
        control recordation of the first act in association with the second act based on the determined second act;
        trace associated acts of the plurality of acts in order from the first act to a third act based on a two-way list, wherein
            the associated acts are traced based on information that indicates association between the plurality of acts,
            the two-way list comprises a plurality of nodes that corresponds to the plurality of acts,
            a first node of the plurality of nodes is associated with a second node of the plurality of nodes by a parent child relationship, and
            the third act is a parent act for the first act and the second act;
        generate a control signal to notify the second user, wherein
            the notification indicates that the first act is a return, based on the third act performed by the second user prior to the first act, to the second user, and
            the control signal is generated based on inclusion of the third act in the associated acts of the plurality of acts;
        control transmission of the generated control signal to a client device that corresponds to the second user; and
        control the client device to display a notification screen that includes a path along which the third act performed by the second user has returned to the second user.

2. The information processing system according to claim 1, wherein the circuitry is further configured to control the recordation of the first act in association with the second act performed by a user different from the second user.

3. The information processing system according to claim 1, wherein the second act is performed within a period of time after the first act.

4. The information processing system according to claim 1, wherein
    the notification screen further includes:
        a plurality of icons that indicates the plurality of users,
        a date of occurrence of each of the plurality of acts, and
        an arrow that indicates an execution direction of each of the plurality of acts, and
    the arrow connects the plurality of icons in the notification screen.

5. The information processing system according to claim 1, wherein the circuitry is further configured to:
    acquire position information associated with each of the plurality of acts; and
    generate graph data based on the acquired position information, wherein the graph data includes an icon that indicates the first user along with a position of the first act on a map.

6. The information processing system according to claim 1, wherein at least one of the first act, the second act, or the third act is an act of kindness.

7. The information processing system according to claim 1, wherein at least one of the first act, the second act, or the third act is a word-of-mouth act.

8. The information processing system according to claim 1, wherein the acquired act information includes a date of occurrence and a time of occurrence of the first act.

9. An information processing method, comprising:
    acquiring act information that indicates occurrence of a first act of a plurality of acts from a first user of a plurality of users to a second user of the plurality of users;
    accumulating information associated with the first user, the second user, and a type of act of each of the plurality of acts in order of occurrence of the plurality of acts, wherein
        the first user performs the first act, and
        the second user is influenced by the first act;
    determining a second act from the plurality of acts based on an influence of the second act on the first act and the influence of the second act on the first user;
    controlling recordation of the first act in association with the second act based on the determined second act;
    tracing associated acts of the plurality of acts in order from the first act to a third act based on a two-way list, wherein
        the associated acts are traced based on information that indicates association between the plurality of acts,
        the two-way list comprises a plurality of nodes that corresponds to the plurality of acts,
        a first node of the plurality of nodes is associated with a second node of the plurality of nodes by a parent child relationship, and
        the third act is a parent act for the first act and the second act;
    generating a control signal to notify the second user, wherein
        the notification indicates that the first act is a return, based on the third act performed by the second user prior to the first act, to the second user, and
        the control signal is generated based on inclusion of the third act in the associated acts of the plurality of acts;
    controlling transmission of the generated control signal to a client device that corresponds to the second user; and
    controlling the client device to display a notification screen that includes a path along which the third act performed by the second user has returned to the second user.

* * * * *